(12) United States Patent
Onoma

(10) Patent No.: US 12,504,138 B2
(45) Date of Patent: Dec. 23, 2025

(54) VEHICLE LIGHT-GUIDING BODY AND VEHICLE LIGHTING UNIT

(71) Applicant: Ichikoh Industries, Ltd., Isehara (JP)

(72) Inventor: Kei Onoma, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/867,689

(22) PCT Filed: May 29, 2023

(86) PCT No.: PCT/JP2023/019926
§ 371 (c)(1),
(2) Date: Nov. 20, 2024

(87) PCT Pub. No.: WO2023/234259
PCT Pub. Date: Dec. 7, 2023

(65) Prior Publication Data
US 2025/0341296 A1  Nov. 6, 2025

(30) Foreign Application Priority Data

May 31, 2022  (JP) ................................. 2022-088853

(51) Int. Cl.
*F21S 41/32*  (2018.01)
*F21S 41/147*  (2018.01)
(Continued)

(52) U.S. Cl.
CPC ........... *F21S 41/322* (2018.01); *F21S 41/147* (2018.01); *F21S 41/25* (2018.01); *F21S 41/295* (2018.01)

(58) Field of Classification Search
CPC .......... F21S 41/24; F21S 41/25; F21S 41/147; F21S 41/295; F21S 41/322
See application file for complete search history.

(56) References Cited

U.S. PATENT DOCUMENTS

| 9,822,947 B2 * | 11/2017 | Owada | F21V 7/0091 |
| 2018/0058651 A1 * | 3/2018 | Gromfeld | F21S 41/25 |
| 2025/0230911 A1 * | 7/2025 | Onoma | F21S 41/27 |

FOREIGN PATENT DOCUMENTS

| JP | 6130602 B2 | 5/2017 |
| JP | 2021-086724 A | 6/2021 |
| JP | 2021170505 A | * 10/2021 |

OTHER PUBLICATIONS

Onoma, Vehicle light guide and vehicle lighting unit, 2021, JP2021170505A, https://worldwide.espacenet.com/patent/search/family/078149663/publication/JP2021170505A?q=pn%3DJP2021170505A (Year: 2021).*

(Continued)

*Primary Examiner* — Tracie Y Green
*Assistant Examiner* — Michael Chiang
(74) *Attorney, Agent, or Firm* — Oblon, McClelland, Maier & Neustadt, L.L.P.

(57) ABSTRACT

A light distribution pattern is emitted with appropriate illuminance. A vehicle light-guiding body has an incident surface; a first reflection surface; a second reflection surface; a light shielding portion; an internal reflection surface located between a front-side end part of the second reflection surface and the light shielding portion and internally reflects, to a front, a part of the light internally reflected by the second reflection surface; an emission surface; and an adjustment portion provided at a part which is a rear of the light shielding portion in the internal reflection surface and closer to one of right and left than the focal point of the second reflection surface and emits a part of the light reflected by the second reflection surface from a part different from the emission surface to an outside by internally reflecting or refracting a part of the light reflected by the second reflection surface.

11 Claims, 16 Drawing Sheets

(51) Int. Cl.
    *F21S 41/25*          (2018.01)
    *F21S 41/29*          (2018.01)

(56) References Cited

OTHER PUBLICATIONS

International Search Report issued Jun. 27, 2023 in PCT/JP2023/019926, filed on May 29, 2023, 2 pages.
Office Action dated Oct. 14, 2025, issued in counterpart JP Application No. 2022-088853, w/English Translation, citing documents No. 15. (8 pages).

* cited by examiner

VEHICLE LIGHT-GUIDING BODY AND VEHICLE LIGHTING UNIT

TECHNICAL FIELD

The present invention relates to a vehicle light-guiding body and a vehicle lighting unit.

BACKGROUND ART

There is known a configuration in which functions corresponding to each of a reflector, a shade, a projection lens and the like are integrated in one vehicle light-guiding body (for example, see PTL 1). That is, such a vehicle light-guiding body includes an incident surface on which light from a light source is incident, an internal reflection surface (corresponding to a reflector) that internally reflects the incident light, a light shielding portion (corresponding to a shade) that shields a part of the internally reflected light, and an emission surface (corresponding to a projection lens) that emits the light internally reflected and passing through the light shielding portion and emits a light-distribution pattern to a front of a vehicle.

CITATION LIST

Patent Literature

PTL 1: Japanese Patent No. 6130602

SUMMARY OF THE INVENTION

Problems to be Solved by the Invention

The vehicle light-guiding body as described above is required to emit a light-distribution pattern with appropriate illuminance to a front of a vehicle.

The present invention was made in view of the above, and an object thereof is to provide a vehicle light-guiding body and a vehicle lighting unit capable of emitting a light-distribution pattern with an appropriate illuminance to a front of a vehicle.

Means for Solving the Problem

The vehicle light-guiding body according to the present invention includes: an incident surface on which light from a light source is incident; a first reflection surface that internally reflects the light incident from the incident surface; a second reflection surface that internally reflects, to a front, at least a part of the light reflected by the first reflection surface so as to pass through a focal point and a vicinity of the focal point; a light shielding portion that shields a part of the light reflected by the second reflection surface; an internal reflection surface that is located between a front-side end part of the second reflection surface and the light shielding portion and internally reflects, to a front, a part of the light internally reflected by the second reflection surface; an emission surface that emits light internally reflected by the second reflection surface; and an adjustment portion that is provided at a part which is a rear of the light shielding portion in the internal reflection surface and closer to one of right and left than the focal point of the second reflection surface and emits a part of the light reflected by the second reflection surface from a part different from the emission surface to an outside by internally reflecting or refracting a part of the light reflected by the second reflection surface.

In the above-described vehicle light-guiding body, the adjustment portion has a shape protruding outward from the internal reflection surface and includes an inclined surface inclined downward toward the rear so as to internally reflect a part of the light reflected by the second reflection surface toward a part different from the emission surface on the front side in a front-rear direction, and a folded surface folded upward from a rear-side end part of the inclined surface and connected to the internal reflection surface on the rear side in the front-rear direction.

In the above-described vehicle light-guiding body, the folded surface is provided in a state of standing in a vertical direction as compared with the inclined surface.

In the above-described vehicle light-guiding body, the adjustment portion is formed such that an amount of protrusion gradually decreases from a center part in a right-left direction toward both sides.

In the above-described vehicle light-guiding body, the internal reflection surface has a concave portion recessed inward from the internal reflection surface on the rear of the adjustment portion.

In the above-described vehicle light-guiding body, the adjustment portion has a shape recessed inward from the internal reflection surface, and includes a refraction surface which emits a part of the light reflected by the second reflection surface to the outside on the rear side in the front-rear direction, and a total reflection surface which totally reflects the light emitted from the refraction surface on the front side in the front-rear direction.

In the above-described vehicle light-guiding body, the adjustment portion is formed such that, the further the light shielding portion is separated from the focal point in the right-left direction, the further it is separated from the light shielding portion in the front-rear direction.

In the above-described vehicle light-guiding body, the adjustment portion is formed such that the amount of recess decreases as the adjustment portion approaches the focal point in the right-left direction.

A vehicle lighting unit according to the present invention includes: a light source; and a light-guiding body for light collection, which is the vehicle light-guiding body, for guiding and emitting light from the light source and emitting a light-collection pattern to a front of the vehicle, and a light-guiding body for diffusion that guides the light from the light source and emits a diffusion pattern to the front of the vehicle such that a part thereof overlaps the light-collection pattern.

In the above-described vehicle lighting unit, the adjustment portion has a shape protruding outward from the internal reflection surface, has an inclined surface inclined downward toward the rear so as to internally reflect a part of the light reflected by the second reflection surface toward a part different from the emission surface on the front side in the front-rear direction, and has a folded surface folded upward from a rear-side end part of the inclined surface and connected to the internal reflection surface on the rear side in the front-rear direction, and the light-guiding body for diffusion is formed such that the diffusion pattern does not overlap an adjustment part by the adjustment portion in the light-collection pattern.

In the above-described vehicle lighting unit, the adjustment portion has a shape recessed inward from the internal reflection surface, has a refraction surface which emits a part of the light reflected by the second reflection surface to the outside on the rear side in the front-rear direction, and has a total reflection surface which totally reflects the light emitted from the refraction surface on the front side in the front-rear direction, and the light-guiding body for diffusion is formed such that the diffusion pattern overlaps an adjustment part by the adjustment portion in the light-collection pattern.

Effect of the Invention

According to the present invention, a light-distribution pattern can be emitted to a front of a vehicle with appropriate illuminance.

MODE FOR CARRYING OUT THE INVENTION

Hereinafter, Embodiments of a vehicle light-guiding body and a vehicle lighting unit according to the present invention will be described with reference to the drawings. Note that the present invention is not limited by this Embodiment. In addition, constituent elements in the following Embodiments include those that can be easily replaced by those skilled in the art, or those that are substantially the same. In the following explanation, each of the front-rear, up-down, and right-left directions is a direction in a vehicle-mounted state where a vehicle headlamp is mounted in a vehicle and indicates a direction when a traveling direction of the vehicle is viewed from the driver's seat. Note that, in this Embodiment, it is assumed that the up-down direction is parallel to a vertical direction, and the right-left direction is a horizontal direction.

Figure 1:
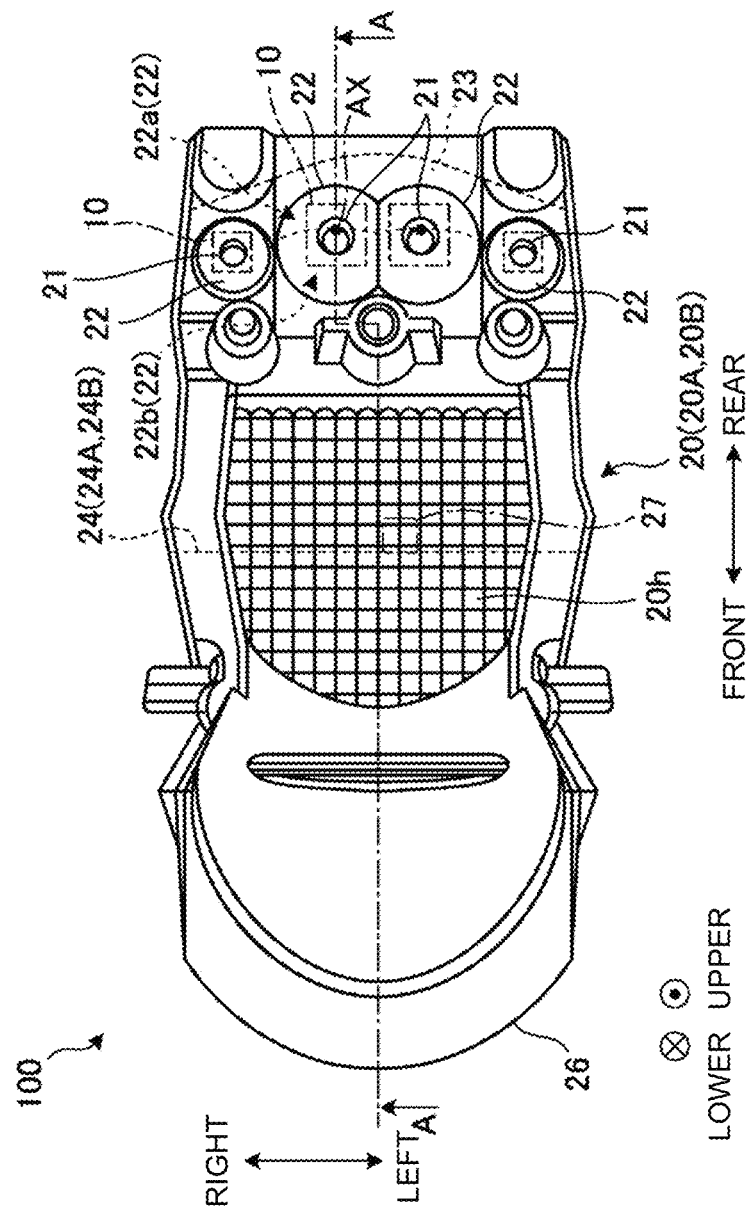
FIG. 1 is a plan view illustrating an example of a vehicle lighting tool according to a First Embodiment.

FIG. 1 is a plan view illustrating an example of a vehicle lighting tool 100 according to this Embodiment. The vehicle lighting tool 100 can emit a low beam pattern P1 (see FIG. 9), which will be described later, to a front of a vehicle. The vehicle lighting tool 100 includes a light source 10 and a vehicle light-guiding body 20. Note that the vehicle lighting tool 100 may be configured to further include other units having a light source, a reflector, a shade, a projection lens, and the like. Hereinafter, in this Embodiment, a configuration of the vehicle lighting tool 100 mounted on a vehicle traveling on a left-side traffic road will be described as an example.

Light Source

In this Embodiment, a semiconductor-type light source such as an LED or an organic EL (OLED), a laser light source, or the like, for example, is used as the light source 10. A light emission surface 11 is disposed to oppose an incident surface 21 of a vehicle light-guiding body 20 described below. The light emission surface 11 is disposed in a state of being faced with the vehicle light-guiding body 20. In this Embodiment, a plurality of the light sources 10 or four units, for example, are disposed in the right-left direction. Note that the number of the light sources 10 is not limited to four but may be three or less, or five or more.

Vehicle Light-Guiding Body

The vehicle light-guiding body 20 guides light from the light source 10 and emits the light to the front in the vehicle-mounted state. The vehicle light-guiding body 20 according to this Embodiment has a configuration in which respective functions corresponding to, for example, a reflector, a shade, a projection lens, and the like in a conventional projector-type vehicle headlamp are integrated. The vehicle light-guiding body 20 includes a light-guiding body 20A for light collection and a light-guiding body 20B for diffusion. Hereinafter, in the description of the vehicle light-guiding body 20, the light-guiding body 20A for light collection and the light-guiding body 20B for diffusion may be distinguished from each other.

Figure 2A:
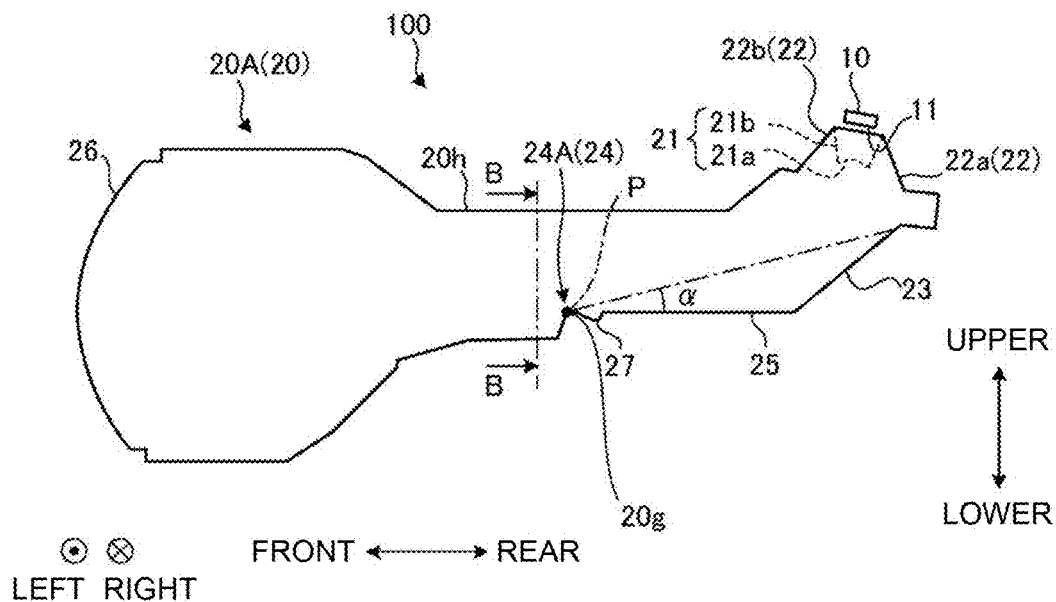
FIG. 2A and FIG. 2B are views illustrating a configuration along an A-A cross section in FIG. 1.
Figure 2B:
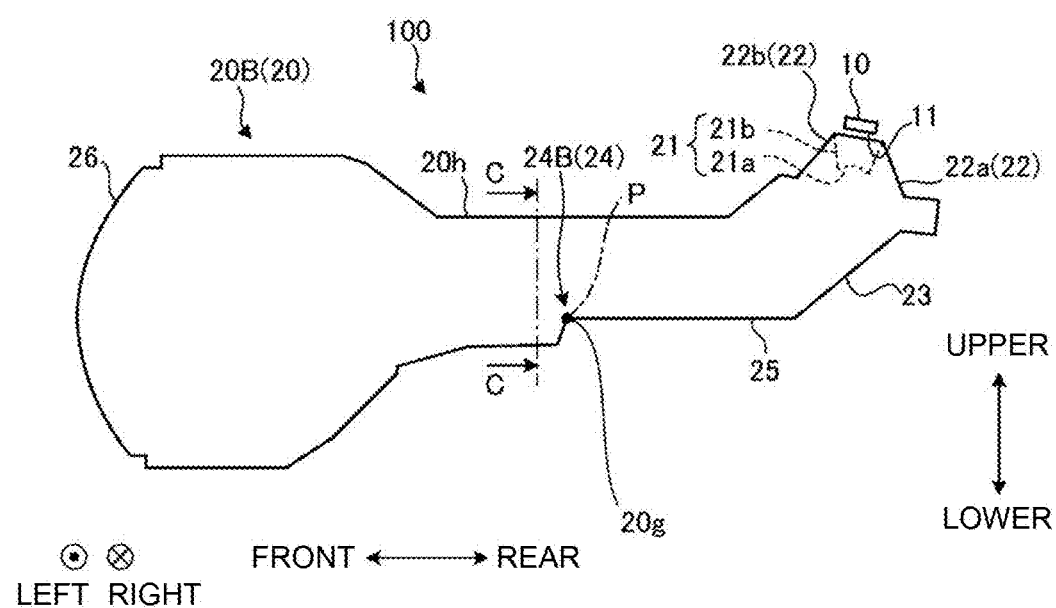

FIG. 2A and FIG. 2B are views illustrating a configuration along an A-A section in FIG. 1. FIG. 2A shows the configuration of the light-guiding body 20A for light collection, and FIG. 2B shows the configuration of the light-guiding body 20B for diffusion. As shown in FIG. 1 and FIGS. 2A and 2B, the vehicle light-guiding body 20 includes the incident surface 21, a first reflection surface 22, a second reflection surface 23, a light shielding portion 24, an internal reflection surface 25, and an emission surface 26.

Incident Surface

The incident surface 21 is provided in plural or for each of the light sources 10, for example. Note that the incident surface 21 may be provided at a position that does not correspond to the light source 10 in a one-to-one manner. For example, a plurality of the incident surfaces 21 may be provided for one light source 10. The plurality of incident surfaces 21 are disposed side by side in the right-left direction in the vehicle-mounted state. The incident surface 21 is formed in a truncated cone shape, for example. In this Embodiment, four pieces of the incident surfaces 21 are disposed, for example. Note that the diameter of the incident surface 21 disposed on an outer side in the right-left direction may be smaller than the diameter of the incident surface 21 disposed on a center side in the right-left direction. In this Embodiment, the diameters of the two incident surfaces 21 disposed on the outer side in the right-left direction are smaller than the diameters of the two incident surfaces 21 on the center side in the right-left direction.

In this Embodiment, the light from the light sources 10 is incident on the two incident surfaces 21 disposed on the center side in the right-left direction in the light-guiding body 20A for light collection of the vehicle light-guiding body 20. In addition, light is caused to be incident on the two incident surfaces 21 disposed on the outer side in the right-left direction of the light-guiding body 20B for diffusion.

Each incident surface 21 has a first surface 21a and a second surface 21b, as shown in FIG. 2A and FIG. 2B. Light from the light source 10 is incident on the first surface 21a and the second surface 21b. The first surface 21a is opposed to the light emission surface 11. The first surface 21a is a convex surface protruding toward the light source 10 side, for example, but it may be a flat surface. The second surface 21b is disposed on the side of the light source 10 and is disposed in a cylindrical surface shape so as to surround the light emission surface 11 of the light source 10 and the first surface 21a.

First Reflection Surface

The first reflection surface 22 internally reflects the light incident from the incident surface 21. The first reflection surface 22 is disposed so as to surround the second surface 21b of the incident surface 21 and reflects the light incident from the second surface 21b toward the second reflection surface 23. In this Embodiment, the first reflection surface 22 is provided correspondingly to the incident surface 21. The first reflection surfaces 22 are disposed in plural side by side in the right-left direction in the vehicle mounted state. The plurality of first reflection surfaces 22 include a reflection surface for light-collection pattern and a reflection surface for diffusion pattern. For example, the two first reflection surfaces 22 disposed on the center side in the right-left direction can be set as reflection surfaces for light-collection pattern, and the two first reflection surfaces 22 disposed on both sides in the right-left direction can be set as reflection surfaces for diffusion pattern.

The first reflection surface 22 has a first rear area 22a and a first front area 22b. The first rear area 22a is disposed on the rear of the light source 10. In this Embodiment, the first rear area 22a is disposed, for example, on the rear of an optical axis AX of the light source 10 in the front-rear direction. The first front area 22b is disposed in front of the light source 10. In this Embodiment, the first front area 22b is disposed, for example, in front of the optical axis AX.

Second Reflection Surface

The second reflection surface 23 has a shape based on a paraboloid of revolution. A part of the second reflection surface 23 has a focal point P which coincides or substantially coincides with a focal point of the paraboloid of revolution. The focal point P is disposed at a position in the vicinity of a focal point of the emission surface 26 described later. The second reflection surface 23 reflects the light from the first reflection surface 22 toward the focal point P side, that is, toward the front of the vehicle. The second reflection surface 23 has an axis parallel or substantially parallel to the optical axis of the light reflected by the first reflection surface 22 and internally reflects the light toward the focal point P side of the paraboloid of revolution.

The second reflection surface 23 includes a light-collection pattern forming area disposed correspondingly to the reflection surface for light-collection pattern of the first reflection surface 22 and a diffusion-pattern forming area disposed correspondingly to the reflection surface for diffusion pattern of the first reflection surface 22. The light-collection pattern forming area is disposed at the center of the second reflection surface 23 in the right-left direction. The diffusion-pattern forming area is disposed on the outer side in the right-left direction with respect to the light-collection pattern forming area in the second reflection surface 23. The light-collection pattern forming area is disposed, for example, at the center in the right-left direction, and internally reflects light from the first reflection surface 22 so that the light passes through the focal point P and the vicinity of the focal point P. The diffusion-pattern forming area internally reflects the light from the first reflection surface 22 so that the light passes through a position including the focal point P and shifted to the outer side in the horizontal direction in the vehicle-mounted state with respect to the focal point P. The diffusion-pattern forming area is disposed correspondingly to the reflection surface for diffusion pattern in the plurality of first reflection surfaces 22.

In the second reflection surface 23, the maximum value α of an angle between the light reflected toward the focal point P and a horizontal plane is smaller than the maximum value of an angle between the light reflected by a so-called projector-type reflector and the horizontal plane. Therefore, the light reflected by the second reflection surface 23 reaches the focal point P at a shallower angle than the light reflected by the reflector of the projector type.

Light Shielding Portion

The light shielding portion 24 shields a part of the light internally reflected by the second reflection surface 23. The light shielding portion 24 is provided at a front-side end part (corner portion 20g) of the internal reflection surface 25 described below. The corner portion 20g has a concave shape when the vehicle light-guiding body 20 is viewed from the outer side (lower side). The corner portion 20g extends linearly or in a curved state in the right-left direction. In the corner portion 20g, the light shielding portion 24 forms a cut-off line CL (see FIG. 7, FIG. 8) of a light-collection pattern PA1 and a diffusion pattern PB1 described below. The cut-off line CL includes horizontal cut-off lines CLa, CLc and oblique cut-off lines CLb, CLd.

The light shielding portion 24 is provided in an area including the corner portion 20g. The light shielding portion 24 may shield light by refracting or internally reflecting light reaching the light shielding portion 24 in a direction different from the direction of the emission surface 26, or may shield light by disposing a light absorbing layer in a portion corresponding to the light shielding portion 24 in the internal reflection surface 25 including the corner portion 20g and causing the light to be absorbed by the light absorbing layer, for example. The light internally reflected or refracted by the light shielding portion 24 is emitted to the outside of the vehicle light-guiding body 20 and is absorbed by an inner housing or the like disposed outside the vehicle light-guiding body 20.

Figure 3A:
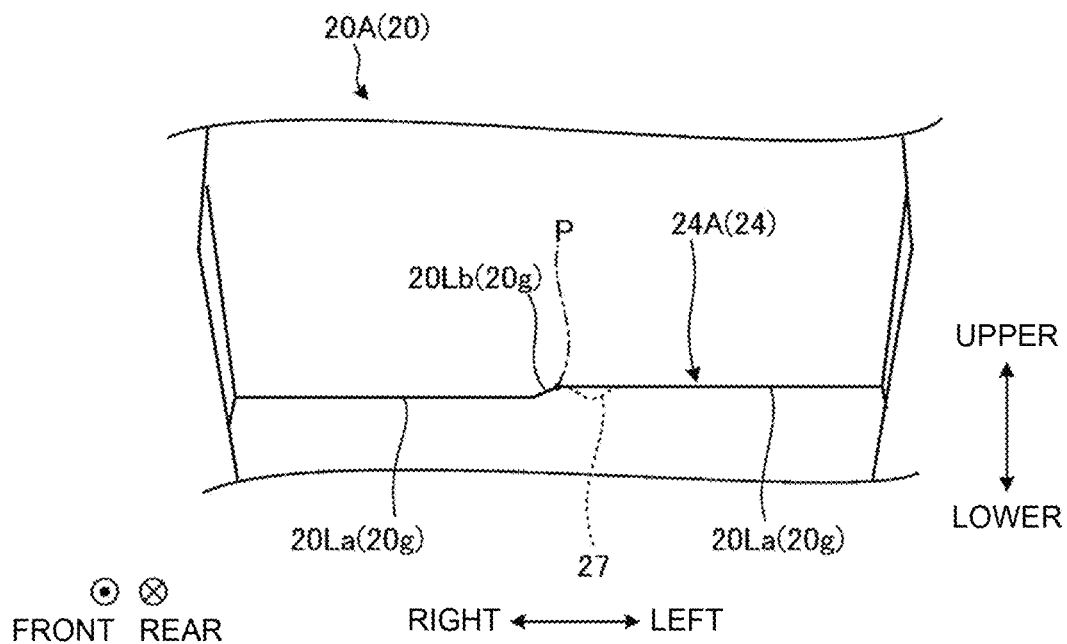
FIG. 3A and FIG. 3B are cross-sectional views illustrating an example of a light shielding portion.
Figure 3B:
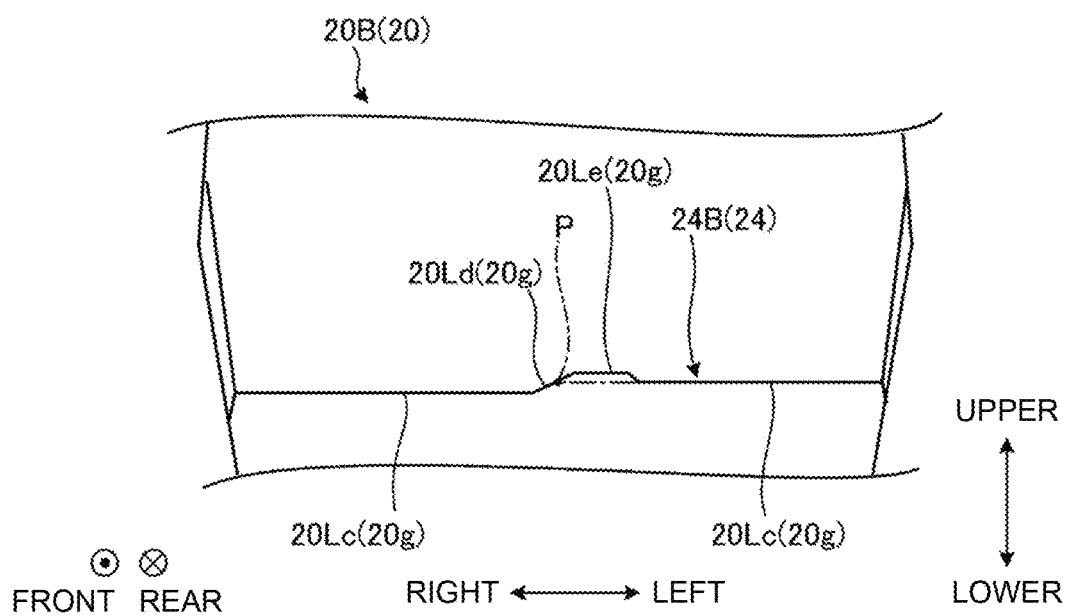

FIG. 3A and FIG. 3B are cross-sectional views illustrating an example of the light shielding portion 24. FIG. 3A is a configuration along a B-B section in FIG. 2A and illustrates the light shielding portion 24 of the light-guiding body 20A for light collection (hereinafter, noted as the light shielding portion 24A). FIG. 3B is a configuration along a C-C section in FIG. 2B and illustrates the light shielding portion 24 of the light-guiding body 20B for diffusion (hereinafter, noted as the light shielding portion 24B). As shown in FIG. 3A, in the light-guiding body 20A for light collection, the corner portion 20g has a horizontal portion 20La for forming the horizontal cut-off line CLa and an inclined portion 20Lb for forming the oblique cut-off line CLb. As shown in FIG. 3B, in the light-guiding body 20B for diffusion, the corner portion 20g has a horizontal portion 20Lc for forming a horizontal cut-off line CLc and an inclined portion 20Ld for forming an oblique cut-off line CLd.

As shown in FIG. 3A and FIG. 3B, the light shielding portion 24B of the light-guiding body 20B for diffusion has a length of the inclined portion 20Ld from a traveling lane side (left side) of the own vehicle toward the traveling lane side (right side) of an oncoming vehicle longer than the light shielding portion 24A of the light-guiding body 20A for light collection. In addition, the light shielding portion 24B of the light-guiding body 20B for diffusion has a part extending from the inclined portion 20Ld to the traveling lane side (right side) of the oncoming vehicles disposed above the light shielding portion 24A of the light-guiding body 20A for light collection. As described above, in the light-guiding body 20B for diffusion, a concave portion 20Le in which a part corresponding to an adjustment portion 27, which will be described later, of the light-guiding body 20A for light collection is recessed upward is formed in the right-left direction. In the light-guiding body 20B for diffusion, the concave portion 20Le is provided and thus, as will be described later, it is so configured that the diffusion pattern PB1 does not overlap an adjustment area PR1, which is an adjustment part by the adjustment portion 27, in the light-collection pattern PA1 (see FIG. 9 and the like).

Internal Reflection Surface

The internal reflection surface 25 extends forward from the front-side end part of the second reflection surface 23. The internal reflection surface 25 is located between the front-side end part of the second reflection surface 23 and the light shielding portion 24. The internal reflection surface 25 is provided in a state following the horizontal plane. In this Embodiment, the internal reflection surface 25 is, for example, planar. Note that the internal reflection surface 25 is not limited to a planar shape but may have a curved shape. The internal reflection surface 25 is not limited to the configuration following the horizontal plane, but may have such a configuration that the front side is inclined downward with respect to the horizontal plane. In the internal reflection surface 25, such an area capable of internal reflection in the front-rear direction is ensured.

Figure 4:
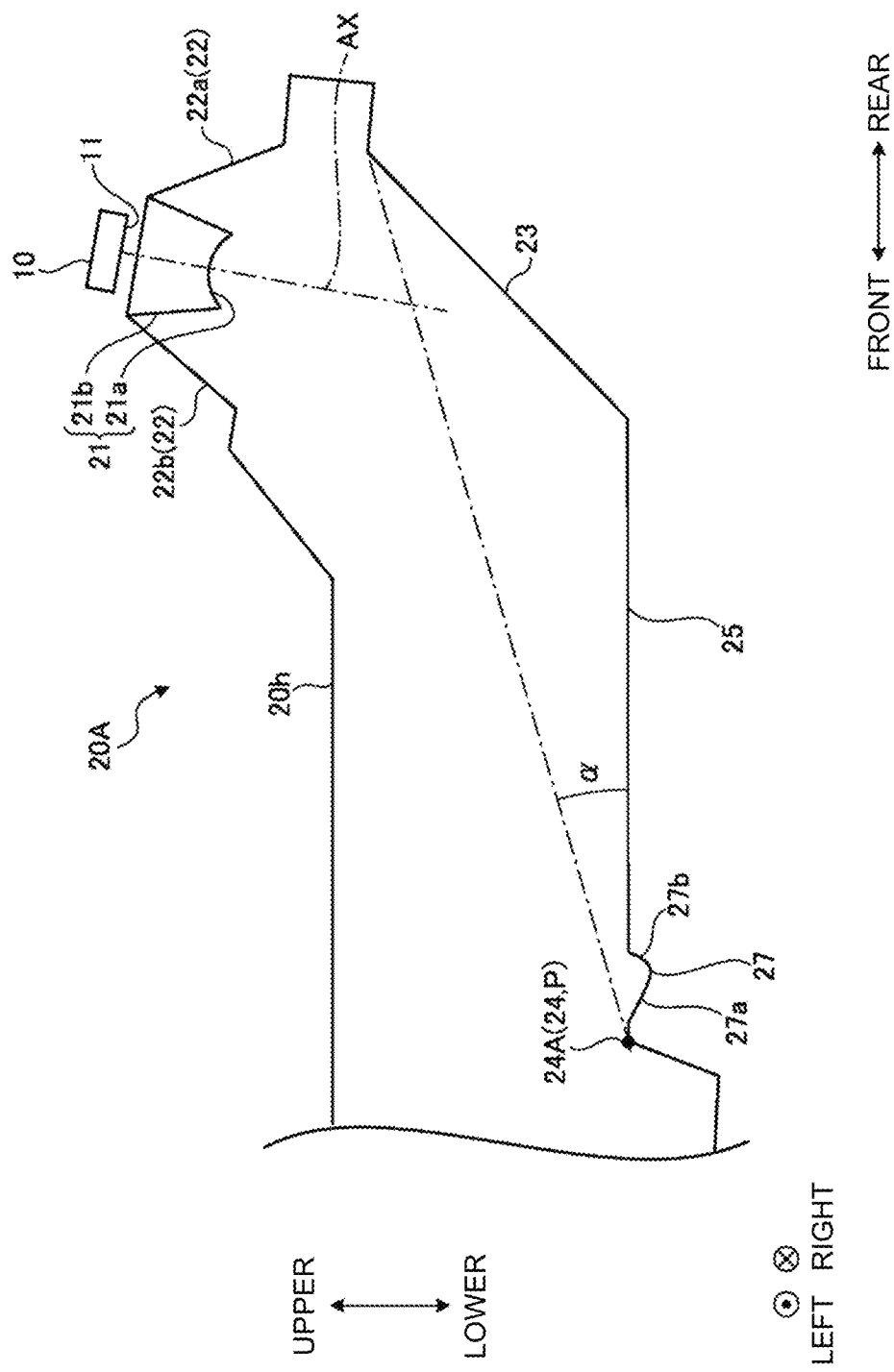
FIG. 4 is a view of a part of FIG. 2A in an enlarged manner.

FIG. 4 is an enlarged view of a part of FIG. 2A. As shown in FIG. 4, in the vehicle light-guiding body 20, the adjustment portion 27 is provided on the internal reflection surface 25 of the light-guiding body 20A for light collection. Note that the adjustment portion 27 is not provided on the internal reflection surface 25 of the light-guiding body 20B for diffusion. The adjustment portion 27 is disposed in the vicinity of the light shielding portion 24. The adjustment portion 27 is provided in order to adjust light intensity corresponding to the adjustment area PR1 in the vicinity of the horizontal cut-off line CLa on the opposite lane side with respect to the own vehicle in the light-collection pattern PA1 (see FIG. 7), which will be described later. Specifically, the adjustment portion 27 internally reflects a part of the light corresponding to the adjustment area PR1 upward, thereby reducing the light intensity of the adjustment area PR1. The adjustment portion 27 is disposed on a side corresponding to the traveling lane of the own vehicle with respect to the focal point P in the right-left direction and is disposed at a position closer to the left side with respect to the focal point P in this Embodiment.

The adjustment portion 27 has a convex shape when viewed from the outside of the vehicle light-guiding body 20, for example. The adjustment portion 27 is formed such that an amount of protrusion gradually decreases from the center part in the right-left direction toward both sides (see FIG. 3A and FIG. 3B). The adjustment portion 27 has an inclined surface 27a and a folded surface 27b. The inclined surface 27a is inclined downward from the light shielding portion 24 toward the rear. The inclined surface 27a internally reflects the light reflected by the second reflection surface 23 upward. With this configuration, the light internally reflected by the inclined surface 27a does not reach the emission surface 26 but is emitted to the outside of the vehicle light-guiding body 20 from an upper surface 20h or the like, for example. A shape of the inclined surface 27a such as an inclination angle or the like is set so that a part of the light reflected by the second reflection surface 23 does not reach the emission surface 26 but is emitted from the upper surface 20h or the like.

The folded surface 27b is folded upward from a rear end of the inclined surface 27a and is connected to the internal reflection surface 25. The folded surface 27b is inclined or curved upward from the rear end of the inclined surface 27a. The folded surface 27b is provided in a state of standing in the up-down direction as compared with the inclined surface 27a. When viewed from above or below, the folded surface 27b has a size in the front-rear direction smaller than that of the inclined surface 27a. That is, the adjustment portion 27 has a shape in which the rear side where the folded surface 27b is provided protrudes or expands as compared with the front side where the inclined surface 27a is provided. The shape and the like of the folded surface 27b are set so that the light reflected by the second reflection surface 23 does not enter the folded surface 27b. Emission Surface The emission surface 26 emits light which is internally reflected by the second reflection surface 23 and is not shielded by the light shielding portion 24 irradiates the front of the vehicle with the light-collection pattern PA1 (see FIG. 7) or the diffusion pattern PB1 (see FIG. 8). In this Embodiment, the emission surface 26 has a curved shape, for example, and has a focal point, not shown, and an optical axis. Note that the emission surface 26 may have a planar shape, for example, and may have such a configuration that another optical element that irradiates the front of the vehicle with light emitted from the emission surface 26 is disposed. The focal point of the emission surface 26 is disposed at a position in the vicinity of the focal point P of the second reflection surface 23. In addition, in this Embodiment, a width of the emission surface 26 in the right-left direction may be smaller than a width of the second reflection surface 23 in the right-left direction. In this case, dimensions of the emission surface 26 as viewed from the outside can be suppressed.

A light diffusion portion such as a prism portion may be formed on the upper surface 20h of the vehicle light-guiding body 20. The light diffusion portion diffuses the light internally reflected by the second reflection surface 23. Therefore, it is possible to suppress the light internally reflected by the upper surface 20h and emitted to the outside of the vehicle light-guiding body 20 from the emission surface 26 from becoming glare.

Operation

Figure 5:
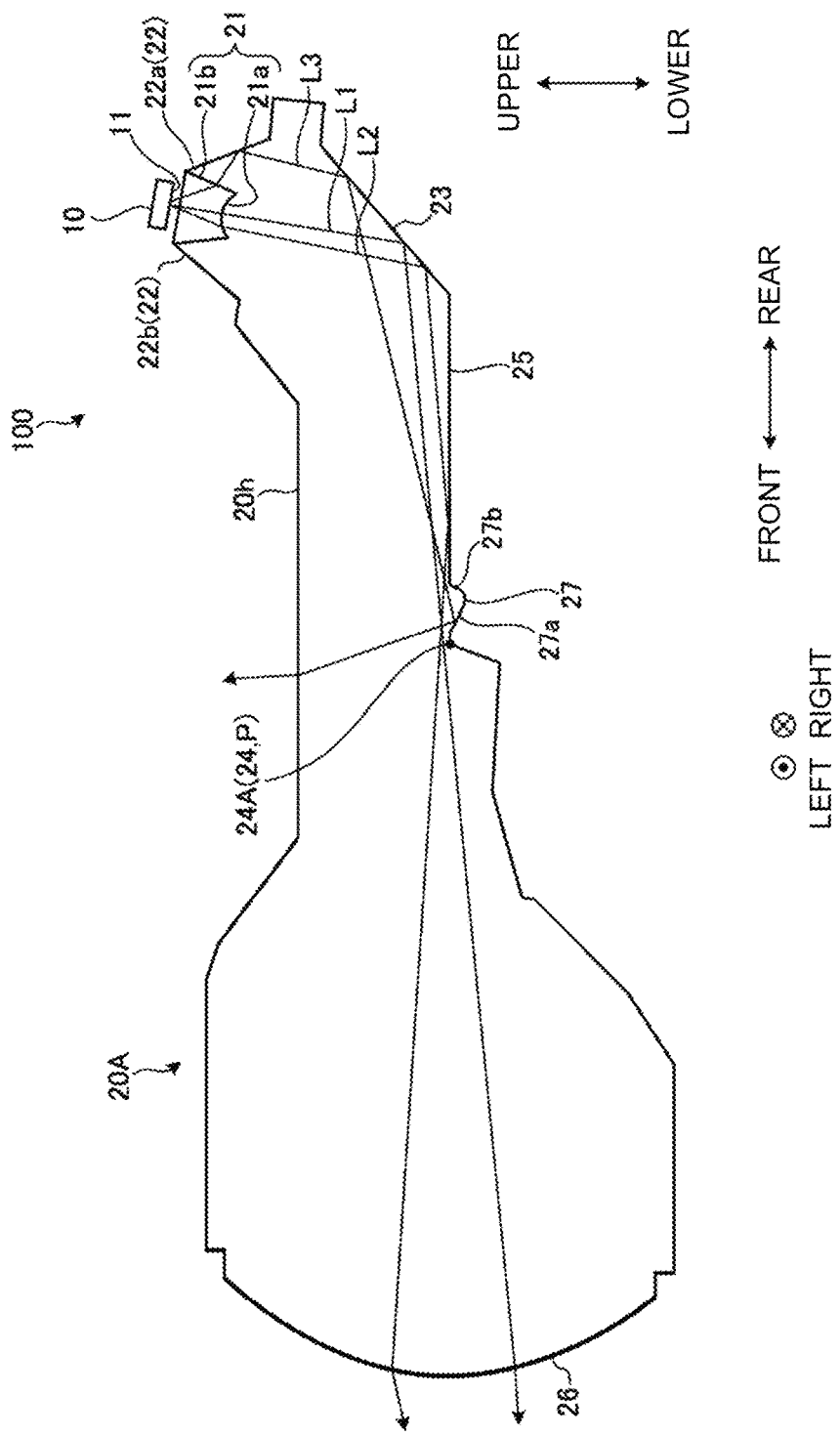
FIG. 5 is a view illustrating an example of an optical path of light guided by a light-guiding body for light collection.
Figure 6:
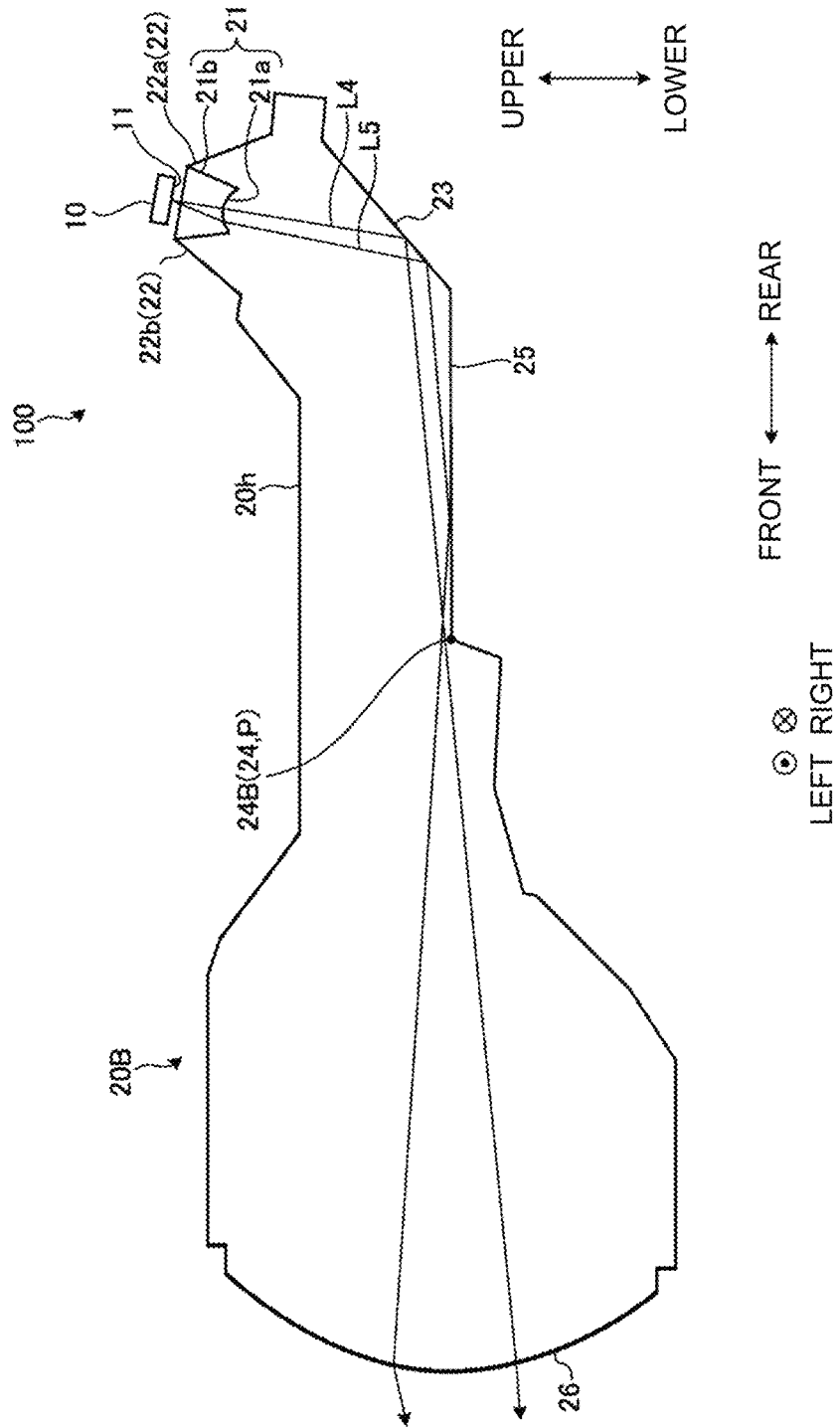
FIG. 6 is a view illustrating an example of an optical path of light guided by a light-guiding body for diffusion.

Subsequently, an operation of the vehicle lighting tool 100 configured as described above will be described. FIG. 5 and FIG. 6 are views showing examples of optical paths guided by the vehicle light-guiding body 20. Note that FIG. 5 shows an example of an optical path guided by the light-guiding body 20A for light collection, and FIG. 6 shows an example of an optical path guided by the light-guiding body 20B for diffusion.

When the light source 10 of the vehicle lighting tool 100 is turned on, light is radiated from the light emission surface 11. This light is incident from the first surface 21a and the second surface 21b of the incident surface 21 into the vehicle light-guiding body 20. The light incident from the first surface 21a advances toward the second reflection surface 23 side. The light incident from the second surface 21b is internally reflected on the first reflection surface 22 toward the second reflection surface 23.

As shown in FIG. 5, for example, in the light-guiding body 20A for light collection, a part of light L1 of the light that has reached the second reflection surface 23 is internally reflected by the second reflection surface 23, passes above the internal reflection surface 25 and the light shielding portion 24, and reaches the emission surface 26. The light L1 that has reached the emission surface 26 is emitted from the emission surface 26 to the front of the vehicle.

A part of light L2 in the light that has reached the second reflection surface 23 is internally reflected by the second reflection surface 23 and reaches the internal reflection surface 25. In this Embodiment, it is formed over the entire area in the front-rear direction from the second reflection surface 23 to the light shielding portion 24. Therefore, the light L2 that reaches the internal reflection surface 25 is internally reflected to the front of the vehicle without waste. The light L2 internally reflected by the internal reflection surface 25 passes above the light shielding portion 24 and reaches the emission surface 26. The light L2 that has reached the emission surface is emitted from the emission surface 26 to the front of the vehicle.

A part of light L3 of the light that has reached the second reflection surface 23 is internally reflected by the second reflection surface 23 and reaches the inclined surface 27a of the adjustment portion 28. The light L3 that reaches the inclined surface 27a is internally reflected by the inclined surface 27a and emitted from the upper surface 20h to the outside of the vehicle light-guiding body 20. This light L3 is not emitted from the emission surface 26. In this way, the shape of the pattern formed by the light L2 emitted from the emission surface 26 is adjusted by causing a part of the light internally reflected by the second reflection surface 23 to reach the inclined surface 27a.

On the other hand, as shown in FIG. 6, in the light-guiding body 20B for diffusion, a part of light L4 of the light that has reached the second reflection surface 23 is internally reflected by the second reflection surface 23, passes above the internal reflection surface 25 and the light shielding portion 24, and reaches the emission surface 26. The light L4 that has reached the emission surface 26 is emitted from the emission surface 26 to the front of the vehicle.

A part of light L5 of the light that has reached the second reflection surface 23 is internally reflected by the second reflection surface 23 and reaches the internal reflection surface 25. The light L5 that reaches the internal reflection surface 25 is internally reflected to the front of the vehicle. The light L5 internally reflected by the internal reflection surface 25 passes above the light shielding portion 24 and reaches the emission surface 26. The light L5 that has reached the emission surface is emitted from the emission surface 26 to the front of the vehicle.

Figure 7:
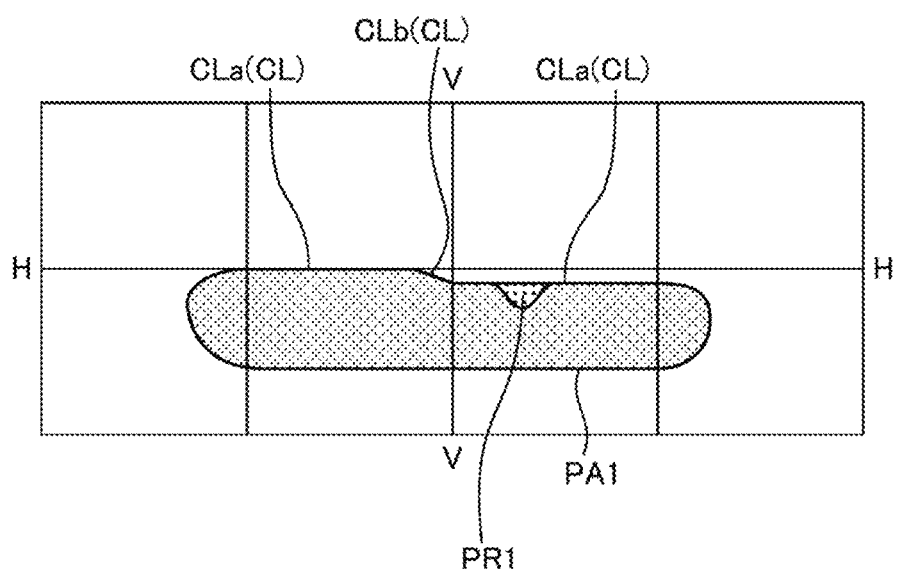
FIG. 7 is a diagram illustrating an example of a light-collection pattern emitted to a virtual screen in front of a vehicle.
Figure 8:
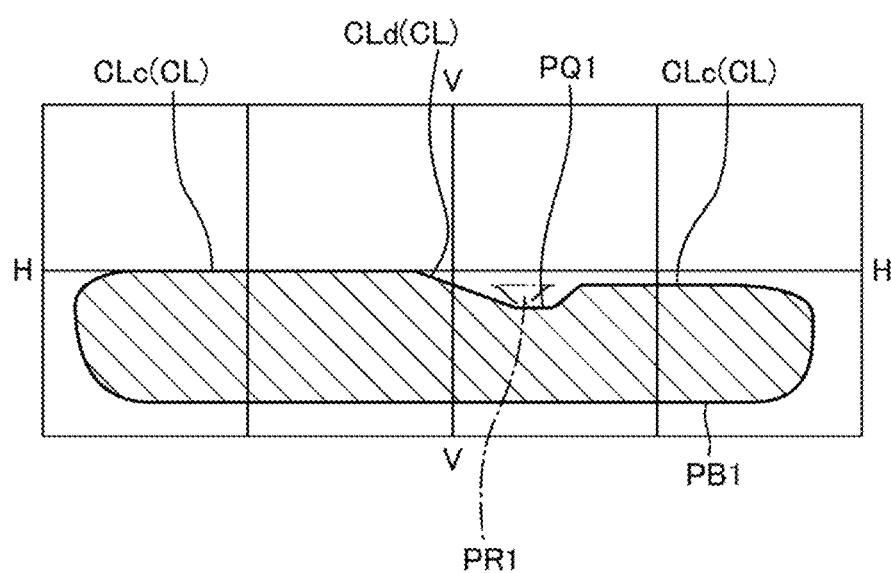
FIG. 8 is a view illustrating an example of a diffusion pattern emitted to a virtual screen in front of a vehicle.
Figure 9:
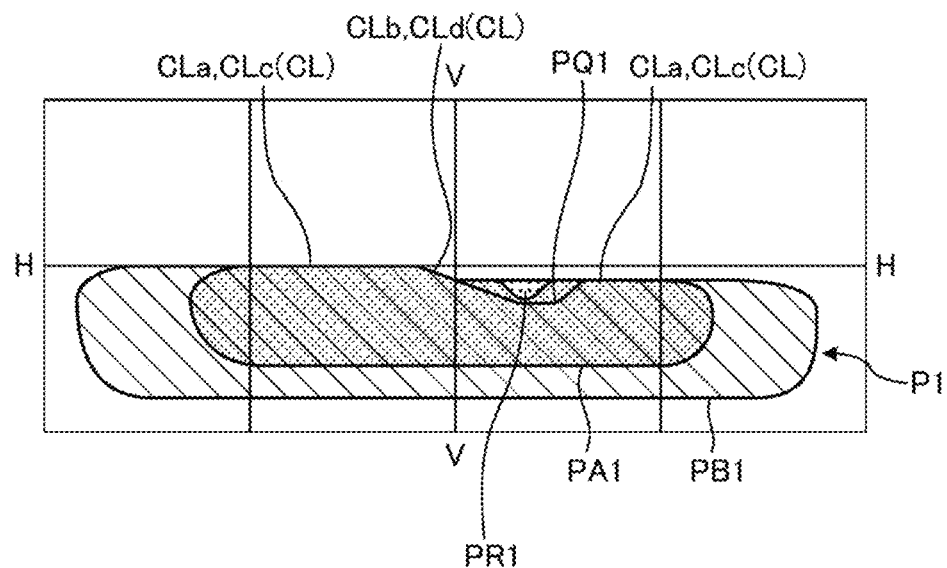
FIG. 9 is a diagram illustrating an example of a synthesized pattern emitted to the virtual screen in front of a vehicle.

FIGS. 7 to 9 are diagrams illustrating examples of light-distribution patterns emitted on a virtual screen in front of the vehicle. FIG. 7 illustrates a light-distribution pattern (light-collection pattern) by the light-guiding body 20A for light collection, and FIG. 8 illustrates a light-distribution pattern (diffusion pattern) by the light-guiding body 20B for diffusion. FIG. 9 illustrates a light-distribution pattern (low-beam pattern) acquired by synthesizing the light-collection pattern and the diffusion pattern.

In FIGS. 7 to 9, patterns corresponding to a vehicle traveling on a left-side are shown. In addition, in FIGS. 7 to 9, a V-V line indicates a vertical line of the screen and an H-H line indicates a right-left horizontal line of the screen. In addition, here, it is assumed that an intersection between the vertical line and the horizontal line is a reference position in the horizontal direction.

As shown in FIG. 7, the lights L1 and L2 emitted from the emission surface 26 of the light-guiding body 20A for light collection are emitted to the front of the vehicle as the light-collection pattern PA1. Specifically, the lights L1 and L2 that have passed above the light shielding portion 24 of the light-guiding body 20A for light collection and reached the emission surface 26 form the light-collection pattern PA1 including the cut-off line CL. In FIG. 7, an example of a state in which the oblique cut-off line CLb of the cut-off line CL is formed so as to be inclined downward toward the right side is explained, but it is not limiting, and the same description can be made also in a case in which the oblique cut-off line CLb is inclined downward toward the left side.

In the light-guiding body 20A for light collection, a part of the light (light L3) reflected by the second reflection surface 23 is emitted to the outside from a part other than the emission surface 26 of the light-guiding body 20A for light collection via the inclined surface 27a. Therefore, as compared with a configuration in which the inclined surface 27a is not provided, the light-collection pattern PA1 is in a state in which brightness is reduced more than the surroundings in an area corresponding to the light L3, that is, in the adjustment area PR1 in the vicinity of the horizontal cut-off line CLa on the traveling lane side of the own vehicle in the light-collection pattern PA1.

On the other hand, the lights L4 and L5 emitted from the emission surface 26 of the light-guiding body 20B for diffusion are emitted to the front of the vehicle as a diffusion pattern PB1 as shown in FIG. 8. Specifically, the lights L4 and L5 that have passed above the light shielding portion 24 of the light-guiding body 20B for diffusion and reached the emission surface 26 form the diffusion pattern PB1 including the cut-off line CL. In FIG. 8, an example of a state in which the oblique cut-off line CLd of the cut-off line CL is formed so as to be inclined downward toward the right side is explained, but this is not limiting, and the same description can be made also in a case in which the oblique cut-off line CLd is inclined downward toward the left side.

In this Embodiment, the light shielding portion 24B of the light-guiding body 20B for diffusion has a shape in which the upward inclination of the inclined portion 20Lb is increased from the traveling lane side (left side) of the own vehicle toward the traveling lane side (right side) of the oncoming vehicle as compared with the light shielding portion 24A of the light-guiding body 20A for diffusion. In addition, the light shielding portion 24B of the light-guiding body 20B for diffusion has such a shape that a part extending from the inclined portion 20Lb to the traveling lane side (right side) of the oncoming vehicle is recessed upward as compared with the light shielding portion 24A of the light-guiding body 20A for light collection. Due to the shape of the light shielding portion 24B as above, the diffusion pattern PB1 is in a state where an avoidance portion PQ1 in which a part corresponding to the above-described adjustment area PR1 is cut out downward is formed as compared with the light-collection pattern PA1.

By synthesizing the light-collection pattern PA1 and the diffusion pattern PB1, as shown in FIG. 9, a low beam pattern P1 is formed in the front of the vehicle. Since the avoidance portion PQ1 is formed in the diffusion pattern PB1 with the low beam pattern P1, only the light-collection pattern PA1 is irradiated in the adjustment area PR1. Since irradiation is performed in a state in which the brightness of the light-collection pattern PA1 is reduced, a rapid lowering in brightness is suppressed in the adjustment area PR1. In addition, since the brightness of the light-collection pattern PA1 is not reduced in a part other than the adjustment area PR1, the horizontality of the horizontal cut-off line CLa is ensured.

Vehicle Lighting Unit

Figure 10:
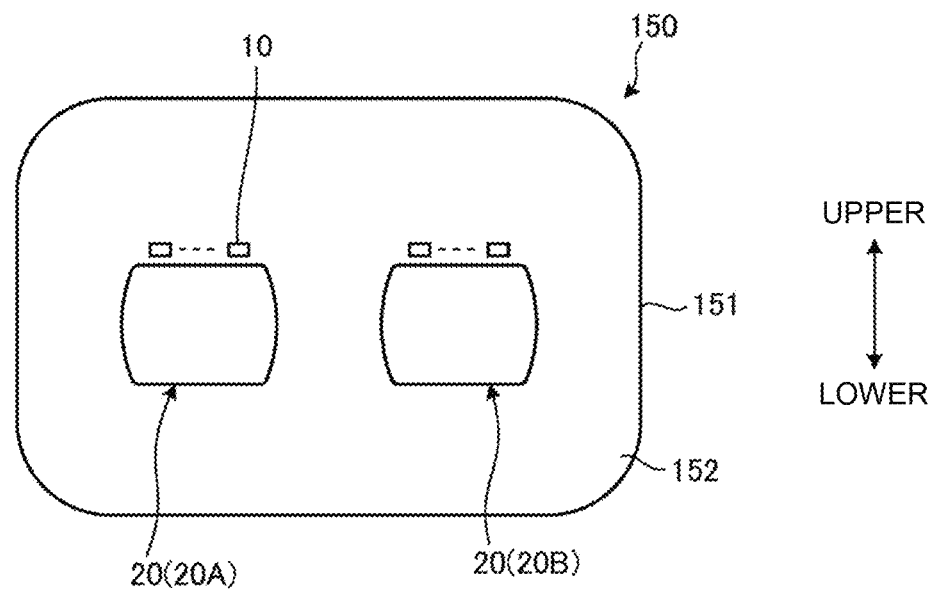
FIG. 10 is a view illustrating an example of a vehicle lighting unit according to a First Embodiment.

FIG. 10 is a view showing an example of a vehicle lighting unit 150 according to this Embodiment. FIG. 10 illustrates an example as viewed from the front in the vehicle-mounted state. A vehicle lighting unit 150 shown in FIG. 10 includes a housing 151, an outer lens 152, the light sources 10, and a plurality of vehicle light-guiding bodies 20. The vehicle lighting unit 150 has a configuration in which, for example, two units of the vehicle light-guiding bodies 20 are disposed here in a lamp chamber surrounded by the housing 151 and the outer lens 152. Note that there may be one or three or more units of the vehicle light-guiding bodies 20 to be disposed in the lamp chamber. In addition, the vehicle light-guiding bodies 20 are not limited to the disposition in which the vehicle light-guiding bodies 20 are disposed in the right-left direction when viewed from the front, but may be disposed in the up-down direction, may be disposed in an oblique direction, or may be disposed in a state in which two or more of the right-left direction, the up-down direction, and the oblique direction are combined. Note that the number and dispositions of the light sources 10 may be different for the different vehicle light-guiding bodies 20.

For example, one unit of the vehicle light-guiding body 20 may be configured as the light-guiding body 20A for light collection in which the light sources 10 are disposed so that light is incident on the incident surface 21 on the center side in the right-left direction, and the other units of the vehicle light-guiding bodies 20 may be configured as the light-guiding bodies 20B for diffusion in which the light sources 10 are disposed so that light is incident on the incident surface 21 on the outer side in the right-left direction. In addition, at least one of the configuration of the light-guiding body 20A for light collection and the configuration of the light-guiding body 20B for diffusion may be provided in plural. In this case, it is possible to appropriately form the low beam pattern P1 in front of the vehicle as the entire vehicle lighting unit 150 while suppressing heat generation from each of the vehicle light-guiding bodies 20.

As described above, the vehicle light-guiding body 20 according to this Embodiment includes the incident surface 21 to which the light from the light source 10 is incident, the first reflection surface 22 that internally reflects the light incident from the incident surface 21, the second reflection surface 23 that internally reflects at least a part of the light reflected by the first reflection surface 22 forward so as to pass through a focal point and a vicinity of the focal point, the light shielding portion 24 that shields a part of the light reflected by the second reflection surface 23, the internal reflection surface 25 that is located between the front-side end part of the second reflection surface 23 and the light shielding portion 24 and internally reflects a part of the light internally reflected by the second reflection surface 23 toward a front, the emission surface 26 that emits the light internally reflected by the second reflection surface 23, and the adjustment portion 27 that is provided at a part which is rear of the light shielding portion 24 in the internal reflection surface 25 and closer to one of right and left than the focal point of the second reflection surface 23 and emits a part of the light reflected by the second reflection surface 23 from a part different from the emission surface 26 to an outside by internally reflecting or refracting a part of the light reflected by the second reflection surface 23.

Therefore, in the configuration in which at least a part of the light reflected by the first reflection surface 22 is internally reflected forward so as to pass through the focal point and the vicinity of the focal point, the adjustment portion 27 that internally reflects a part of the light passing through the part including the light shielding portion 24 in the light reflected by the second reflection surface 23 so as to emit the light to the outside from a part different from the emission surface 26 is provided at a part closer to the traveling lane side of the own vehicle in the right-left direction than the focal point of the second reflection surface 23. Therefore, the brightness of the light-collection pattern PA1 formed in front of the vehicle by the emission surface 26 is reduced in the adjustment area PR1 in the vicinity of the horizontal cut-off line CLa on the traveling lane side of the own vehicle as compared with the surroundings. As described above, since the brightness of the light-collection pattern PA1 is reduced in the adjustment area PR1, it is possible to suppress a rapid decrease in brightness compared with the surroundings. In addition, since the brightness of the light-collection pattern PA1 is not reduced in a part other than the adjustment area PR1, the horizontality of the horizontal cut-off line CLa is ensured. As a result, the light-distribution pattern can be emitted to the front of the vehicle with an appropriate illuminance.

In the above-described vehicle light-guiding body 20, the adjustment portion 27 has a shape protruding outward from the internal reflection surface 25 and includes the inclined surface 27a inclined downward toward the rear so as to internally reflect a part of light reflected by the second reflection surface 23 toward a part different from the emission surface 26 on the front side in the front-rear direction, and the folded surface 27b folded upward from a rear-side end part of the inclined surface 27a and connected to the internal reflection surface 25 on the rear side in the front-rear direction. According to this configuration, by internally reflecting a part of the light reflected by the second reflection surface 23 by the inclined surface 27a, the part of the light can be made to reliably reach the part different from the emission surface 26. Therefore, the occurrence of glare light can be suppressed.

In the vehicle light-guiding body 20 described above, the folded surface 27b is provided in a state of standing in the up-down direction as compared with the inclined surface 27a. According to this configuration, when a part of the light reflected by the second reflection surface 23 reaches the adjustment portion 27, the light can be made to be incident on the inclined surface 27a more reliably.

In the vehicle light-guiding body 20 described above, the adjustment portion 27 is formed such that the amount of protrusion gradually decreases from the center part in the right-left direction toward the both sides. According to this configuration, the brightness can be adjusted so as to become gradually brighter from the center part toward the both sides in the adjustment area PR1 of the light-collection pattern PA1.

The vehicle lighting unit 150 according to this Embodiment includes the light sources 10, the vehicle light-guiding body 20 that guides and emits the light from the light sources 10, that is, the light-guiding body 20A for light collection that emits the light-collection pattern PA1 to the front of the vehicle and the light-guiding body 20B for diffusion that guides the light from the light sources 10 and emits the diffusion pattern PB1 to the front of the vehicle so as to partially overlap the light-collection pattern PA1. According to this configuration, the light-collection pattern PA1 is formed by the light-guiding body 20A for light collection, and the diffusion pattern PB1 is formed by the diffusion pattern PB1 and thus, it is possible to appropriately adjust the illuminance of the entire pattern.

In the vehicle lighting unit 150 described above, the adjustment portion 27 has an inclined surface 27a having a shape protruding outward from the internal reflection surface 25 and has the inclined surface 27a inclined downward to the rear so as to internally reflect a part of light reflected by the second reflection surface 23 toward a part different from the emission surface 26 on the front side in the front-rear direction, has the folded surface 27b folded upward from the rear-side end part of the inclined surface 27a and connected to the internal reflection surface 25 on the rear side in the front-rear direction, and the light-guiding body 20B for diffusion is formed such that the diffusion pattern PB1 does not overlap the adjustment area PR1, which is an adjustment part by the adjustment portion 27 in the light-collection pattern PA1. According to this configuration, by adopting such a configuration that the adjustment area PR1 is not irradiated with the diffusion pattern PB1, the brightness in the adjustment area PR1 can be appropriately adjusted by the light-guiding body 20A for light collection.

Second Embodiment

Figure 11:
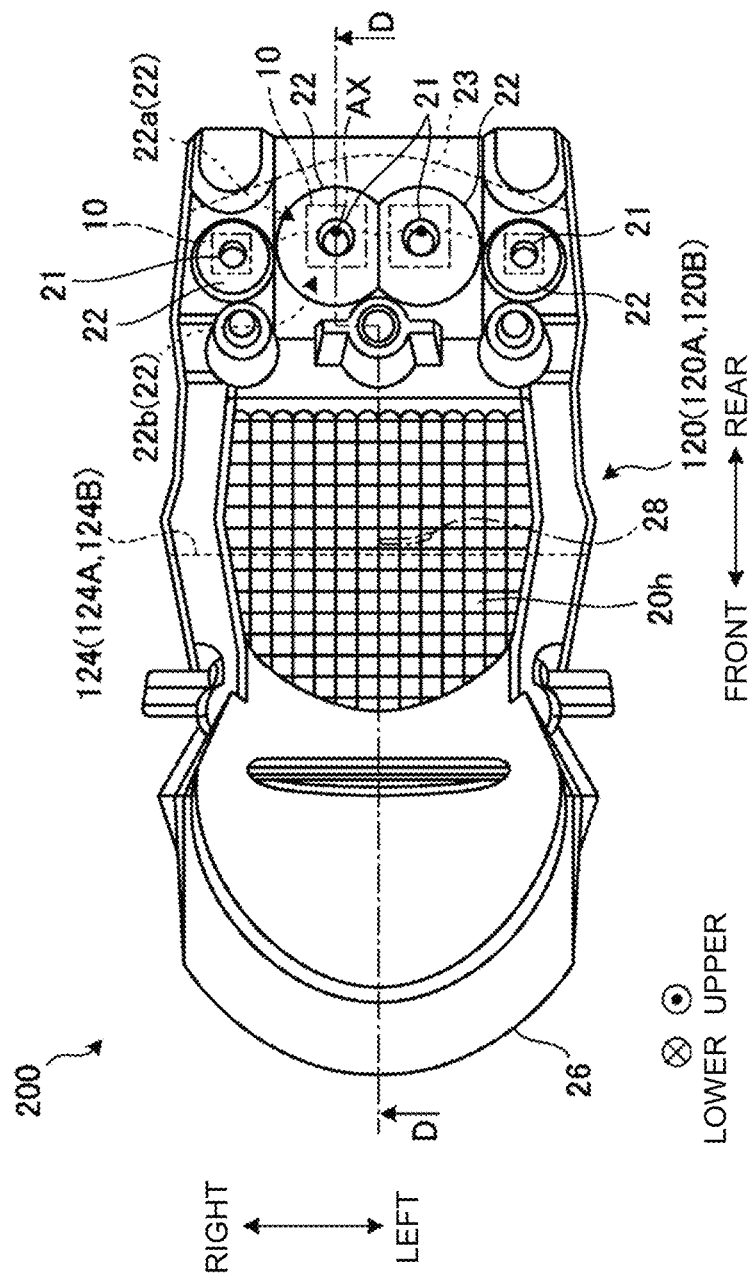
FIG. 11 is a plan view illustrating an example of a vehicle light-guiding body according to a Second Embodiment.
Figure 12A:
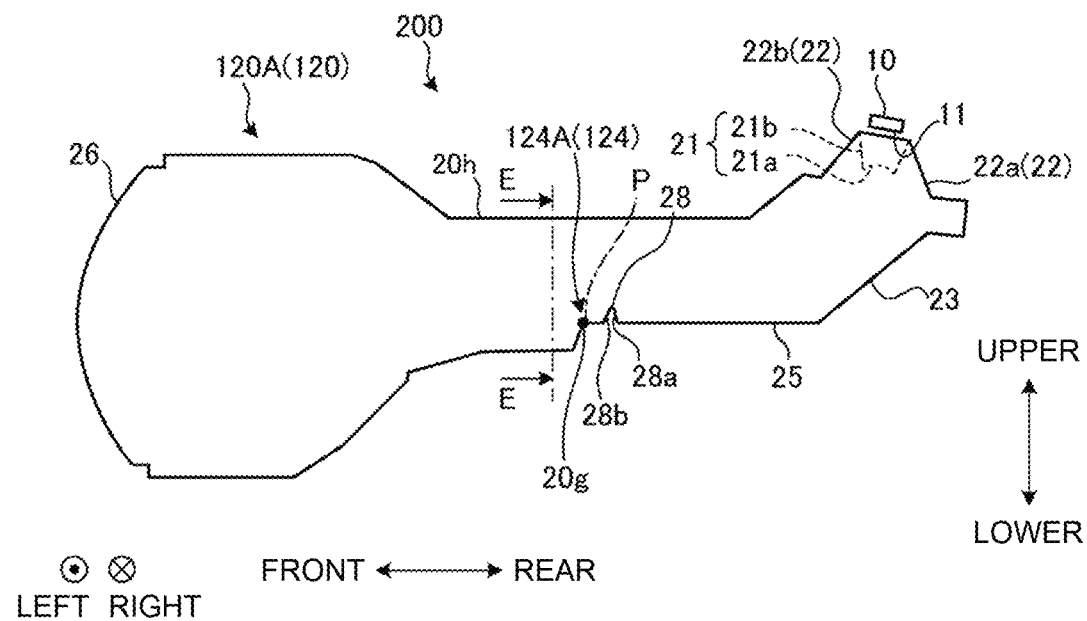
FIG. 12A and FIG. 12B are views illustrating an example of a configuration of a section in FIG. 11.
Figure 12B:
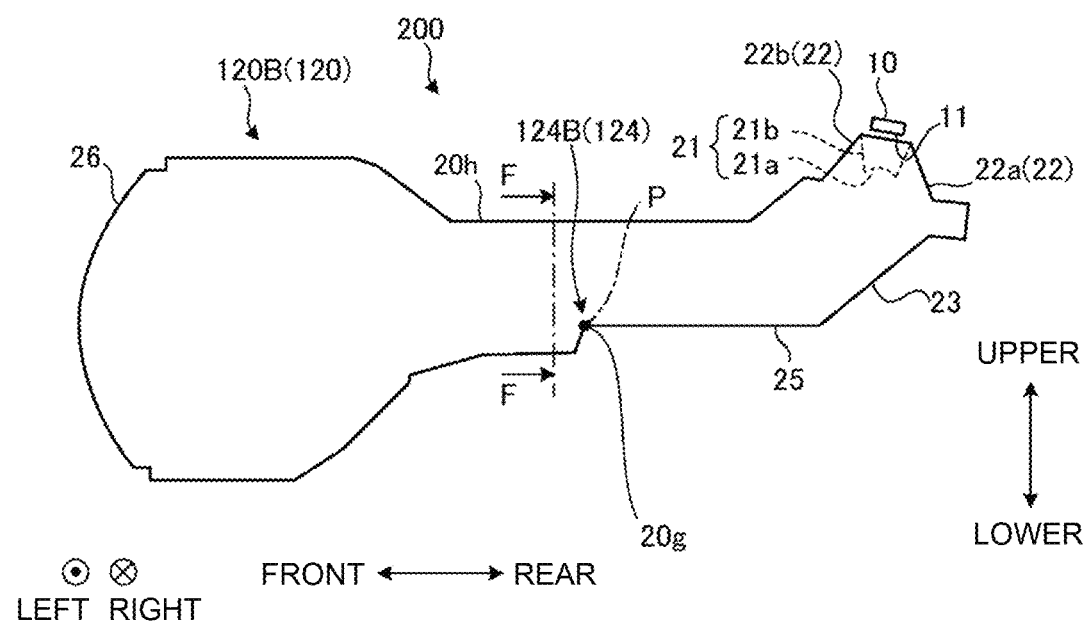

Subsequently, a Second Embodiment will be explained. FIG. 11 and FIGS. 12A, 12B are views illustrating a vehicle light-guiding body 120 according to the Second Embodiment. FIG. 11 is a plan view illustrating an example of the vehicle light-guiding body 120. FIG. 12A and FIG. 12B illustrate a configuration along a D-D section in FIG. 11. FIG. 12A illustrates the configuration of the light-guiding body 120A for light collection, and FIG. 12B illustrates the configuration of the light-guiding body 120B for diffusion.

Figure 13A:
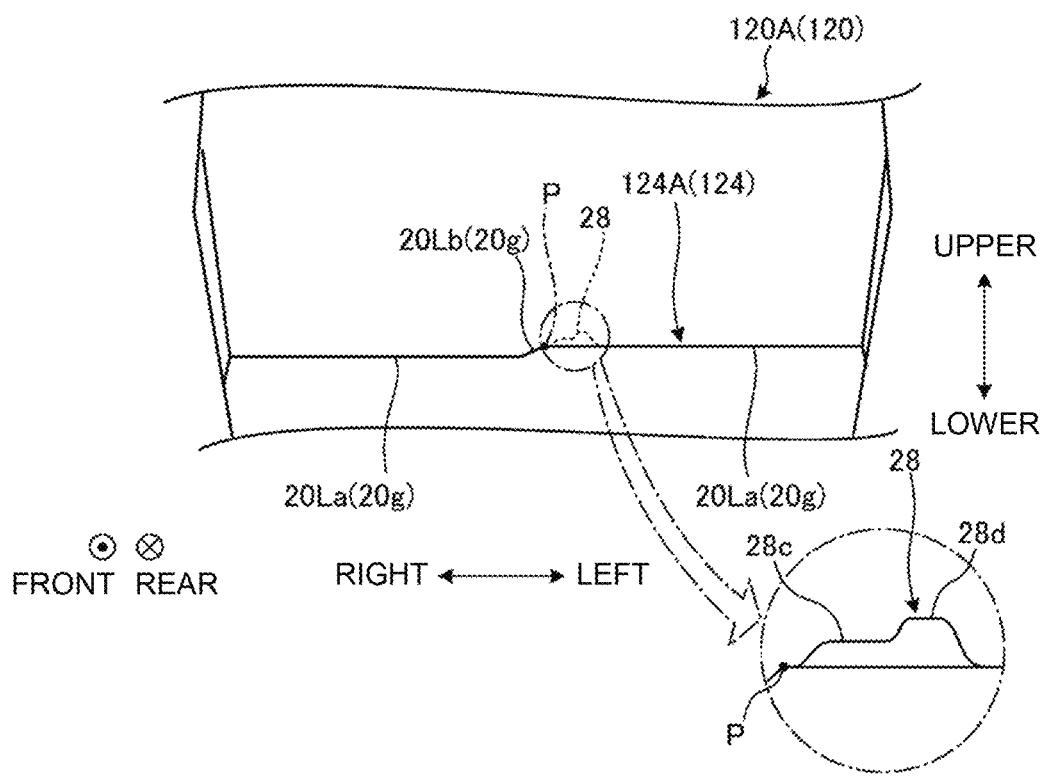
FIG. 13A and FIG. 13B are cross-sectional views illustrating an example of the light shielding portion.
Figure 13B:
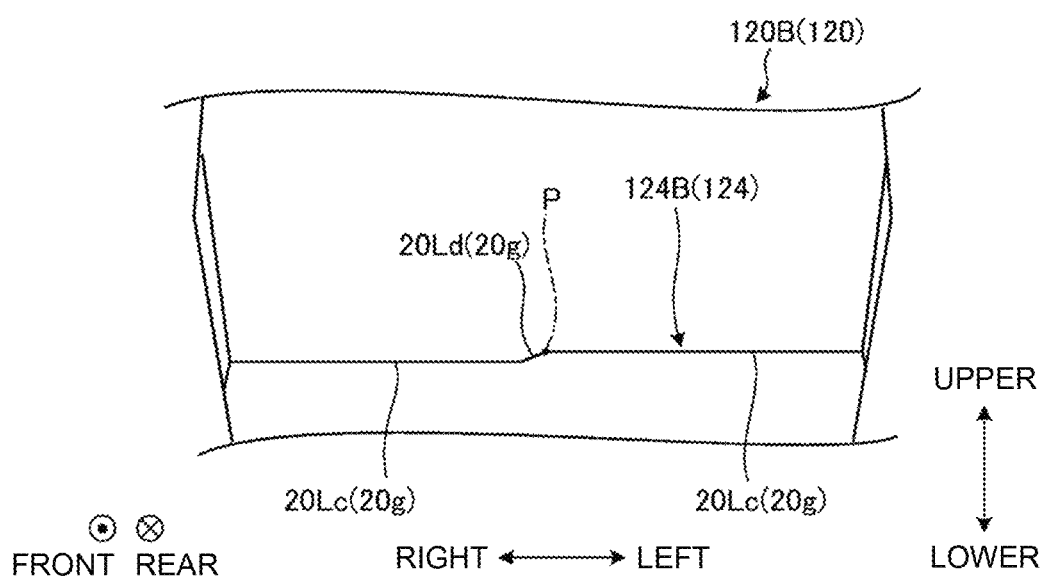

In addition, FIG. 13A and FIG. 13B are views illustrating an example of a light shielding portion 124. FIG. 13A is a configuration along an E-E section in FIG. 12A and illustrates the light shielding portion 124 of the light-guiding body 120A for light collection (hereinafter, noted as the light shielding portion 124A). FIG. 13B is a configuration along an F-F section in FIG. 12B and illustrates the light shielding portion 124 of the light-guiding body 120B for diffusion (hereinafter, noted as the light shielding portion 124B). As shown in FIG. 13A and FIG. 13B, the light shielding portion 124A of the light-guiding body 120A for light collection and the light shielding portion 124B of the light-guiding body 120B for diffusion have substantially the same shape.

In this Embodiment, a concave adjustment portion 28 is provided on the internal reflection surface 25 of the light-guiding body 120A for light collection. Note that the adjustment portion 28 is not provided on the internal reflection surface 25 of the light-guiding body 120B for diffusion. In the light-guiding body 120A for light collection, the configuration other than the adjustment portion 28 is the same as that of the light-guiding body 20A for light collection described in the first Embodiment.

The adjustment portion 28 is disposed in the vicinity of the light shielding portion 24. The adjustment portion 28 is provided in order to adjust light intensity corresponding to the adjustment area PR2 in the vicinity of the horizontal cut-off line CLa on the opposite lane side with respect to the own vehicle in the light-collection pattern PA2 (see FIG. 15), which will be described later. Specifically, the adjustment portion 28 reduces the light intensity of the adjustment area PR2 by emitting a part of the light corresponding to the adjustment area PR2 downward. The adjustment portion 28 is disposed on a side corresponding to the traveling lane of the own vehicle with respect to the focal point P in the right-left direction and at a position closer to the left side with respect to the focal point P in this Embodiment.

The adjustment portion 28 has, for example, a concave shape when viewed from the outside of the vehicle light-guiding body 20. The adjustment portion 28 has a refraction surface 28a on the rear side in the front-rear direction and a total reflection surface 28b on the front side in the front-rear direction. The refraction surface 28a is formed in a state inclined upward toward the front. The refraction surface 28a emits a part of the light reflected by the second reflection surface 23 to the outside. The total reflection surface 28b is formed so as to be folded back downward from the front-side end part of the refraction surface 28a. The total reflection surface 28b is formed in a state of being inclined downward toward the front. The total reflection surface 28b totally reflects the light emitted from the refraction surface 28a. In addition, the adjustment portion 28 is formed such that the further away it is from the focal point P in the right-left direction, the further away it is from the light shielding portion 24 in the front-rear direction. In other words, the adjustment portion 28 is formed such that the closer a part is to the focal point P in the right-left direction, the closer the part becomes to the light shielding portion 24 in the front-rear direction. For example, the adjustment portion 28 extends such that the further away from the focal point P in the right-left direction, the rearer the adjustment portion 28 is disposed. (see FIG. 11). Note that the adjustment portion 28 may be configured to be separated away from the light shielding portion 24 in the front-rear direction as the adjustment portion 28 is separated away from the focal point P in the right-left direction, and the adjustment portion 28 may be configured to be separated away stepwise in the front-rear direction or may include a portion that does not extend rearward. The adjustment portion 28 has a first portion 28c and a second portion 28d in the right-left direction. The first portion 28c is provided on an inner side in the right-left direction. The first portion 28c is formed such that the depth thereof gradually decreases toward the focal point P side. The second portion 28d is provided on an outer side in the right-left direction with respect to the first portion 28c. The second portion 28d is deeper than the first portion 28c. In other words, the second portion 28d is larger than the first portion 28c in a size in the up-down direction of the part intruding from the internal reflection surface 25 to the inside of the light-guiding body 120A for light collection. The second portion 28d is formed such that its depth gradually decreases toward the outer side in the right-left direction.

With the configuration as above, the light reflected by the second reflection surface 23 is emitted to the outside of the light-guiding body 120A for light collection in the refraction surface 28a of the adjustment portion 28 and is reflected downward on the total reflection surface 28*b* of the adjustment portion 28. In other words, regarding the shapes of the refraction surface 28*a* and the total reflection surface 28*b*, the inclination angle and the like are set so that a part of the light reflected by the second reflection surface 23 can be emitted to the outside and reflected downward.

Figure 14:
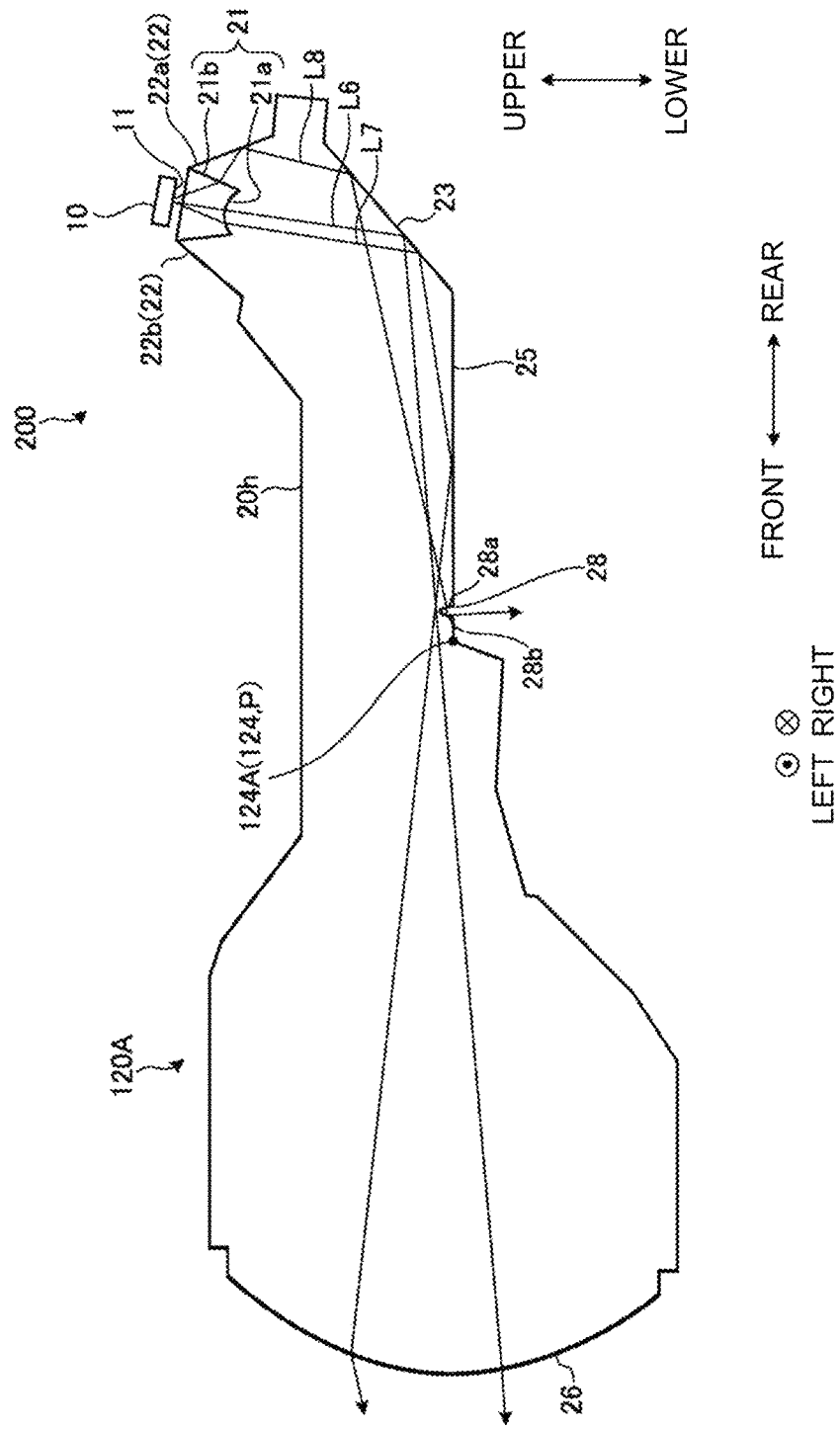
FIG. 14 is a view illustrating an example of an optical path of light guided by a light-guiding body for light collection.

FIG. 14 is a diagram illustrating an example of an optical path in which light is guided by the light-guiding body 120A for light collection. As shown in FIG. 14, for example, in the light-guiding body 120A for light collection, a part of light L6 of the light that was reflected by the first reflection surface 22 and has reached the second reflection surface 23 is internally reflected by the second reflection surface 23, passes above the internal reflection surface 25 and the light shielding portion 24, and reaches the emission surface 26. The light L6 that has reached the emission surface 26 is emitted from the emission surface 26 to the front of the vehicle.

In addition, a part of light L7 of the light that has reached the second reflection surface 23 is internally reflected by the second reflection surface 23 and reaches the internal reflection surface 25. The light L7 that reaches the internal reflection surface 25 is internally reflected to the front of the vehicle without waste, passes above the light shielding portion 24 and reaches the emission surface 26. The light L7 that has reached the emission surface is emitted from the emission surface 26 to the front of the vehicle.

In addition, a part of light L8 of the light that has reached the second reflection surface 23 is internally reflected by the second reflection surface 23 and reaches the refraction surface 28*a* of the adjustment portion 28. The light L8 that reaches the refraction surface 28*a* is refracted by the refraction surface 28*a* and is emitted to the outside of the light-guiding body 120A for light collection. This light L8 is totally reflected downward by the total reflection surface 28*b* in front of the refraction surface 28*a*. Therefore, the light L8 is not emitted from the emission surface 26. As described above, the shape of the pattern formed by the light L7 emitted from the emission surface 26 is adjusted by causing a part of the light internally reflected by the second reflection surface 23 to reach the refraction surface 28*a*.

Note that the light guided by the light-guiding body 120B for diffusion can be explained in the same manner as the light-guiding body 20B for diffusion of the first Embodiment.

Figure 15:
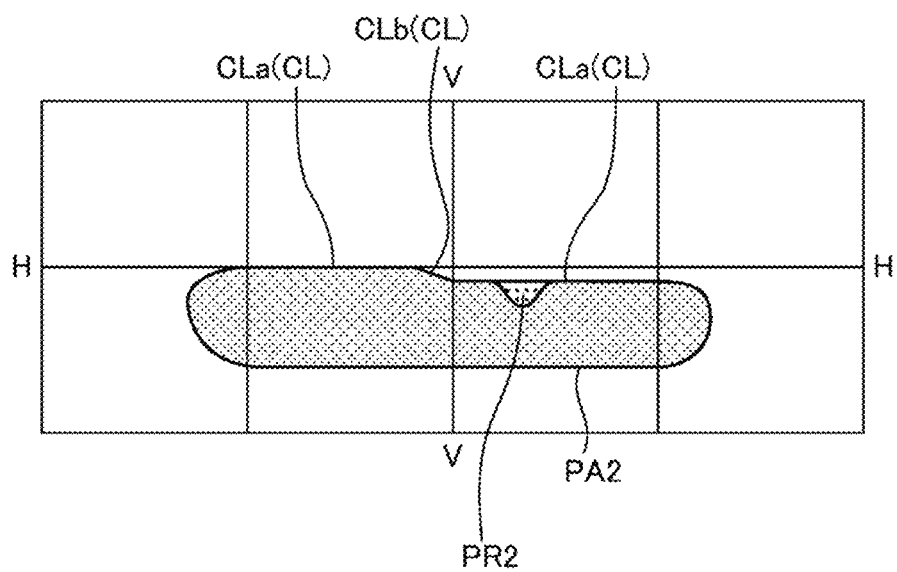
FIG. 15 is a diagram illustrating an example of a light-collection pattern emitted to a virtual screen in front of a vehicle.
Figure 16:
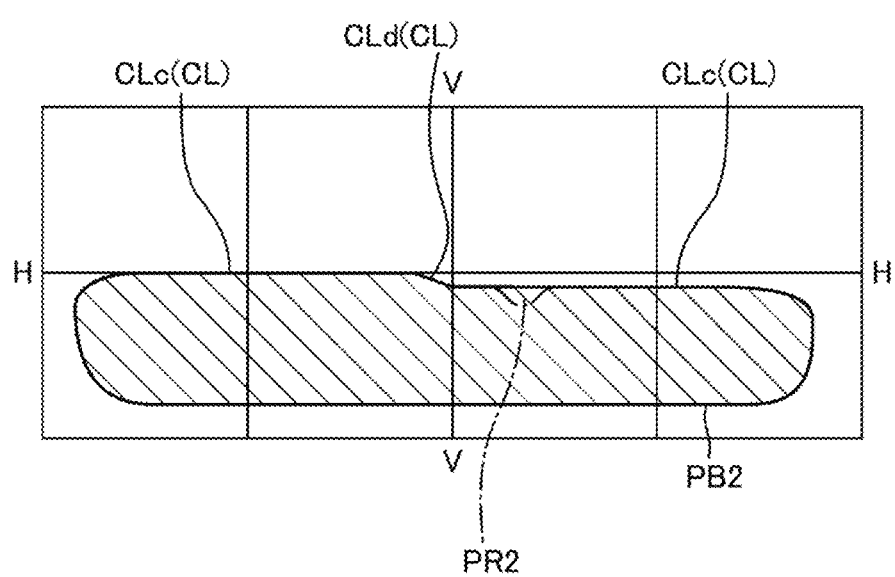
FIG. 16 is a diagram illustrating an example of a diffusion pattern emitted onto a virtual screen in front of a vehicle.
Figure 17:
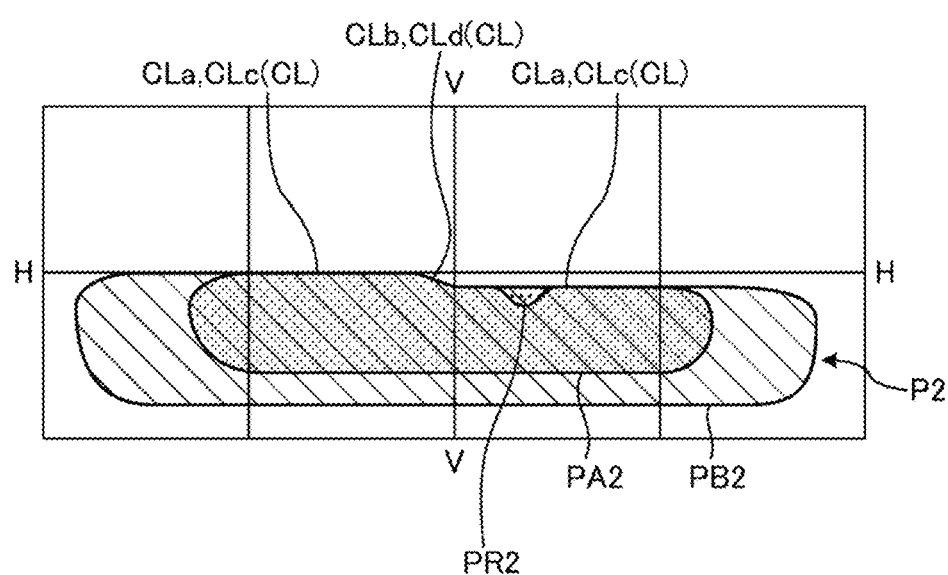
FIG. 17 is a diagram illustrating an example of a synthesized pattern emitted to the virtual screen in front of a vehicle.

FIGS. 15 to 17 are diagrams illustrating examples of light-distribution patterns emitted on a virtual screen in front of the vehicle. FIG. 15 illustrates a light-distribution pattern (light-collection pattern) by the light-guiding body 120A for light collection, and FIG. 16 illustrates an example of a light-distribution pattern (diffusion pattern) by the light-guiding body 120B for diffusion. FIG. 17 illustrates a light-distribution pattern (low-beam pattern) acquired by synthesizing the light-collection pattern and the diffusion pattern.

FIG. 15 to FIG. 17 illustrate patterns corresponding to a vehicle traveling on the left-side. In addition, in FIGS. 15 to 17, a V-V line indicates a vertical line of the screen, and an H-H line indicates a right-left horizontal line of the screen. In addition, here, it is assumed that an intersection between the vertical line and the horizontal line is a reference position in the horizontal direction.

As shown in FIG. 15, the lights L6 and L7 emitted from the emission surface 26 of the light-guiding body 120A for light collection are emitted to the front of the vehicle as a light-collection pattern PA2. Specifically, the lights L6 and L7 that have passed above the light shielding portion 24 of the light-guiding body 120A for light collection and reached the emission surface 26 form the light-collection pattern PA2 including the cut-off line CL. In FIG. 15, an example of a state in which the oblique cut-off line CLb of the cut-off line CL is formed to be inclined downward toward the right side is explained, but it is not limiting, and the similar explanation can be made also in a case in which the oblique cut-off line CLb is inclined downward to the left side.

In the light-guiding body 120A for light collection, a part of the light (light L8) reflected by the second reflection surface 23 is emitted to the outside from a part other than the emission surface 26 of the light-guiding body 120A for light collection via the refraction surface 28*a* and the total reflection surface 28*b*. Therefore, as compared with a configuration in which the refraction surface 28*a* and the total reflection surface 28*b* are not provided, the light-collection pattern PA2 is in a state in which brightness is reduced more than the surroundings in an area corresponding to the light L8, that is, in the adjustment area PR2 in the vicinity of the horizontal cut-off line CLa on the opposite lane side with respect to the own vehicle in the light-collection pattern PA2.

On the other hand, as shown in FIG. 16, the light emitted from the emission surface 26 of the light-guiding body 120B for diffusion is emitted to the front of the vehicle as a diffusion pattern PB2. Specifically, the light that has passed above the light shielding portion 24 of the light-guiding body 120B for diffusion and reached the emission surface 26 forms the diffusion pattern PB2 including the cut-off line CL. In FIG. 16, an example of a state in which the oblique cut-off line CLd of the cut-off line CL is formed so as to be inclined downward toward the right side is explained, but this is not limiting, and the similar explanation can be made also in a case in which the oblique cut-off line CLd is inclined downward toward the left side.

In this Embodiment, the light shielding portion 124B of the light-guiding body 120B for diffusion has the similar shape as the light shielding portion 124A of the light-guiding body 120A for light collection. Therefore, the diffusion pattern PB2 is formed so as to overlap the adjustment area PR2 of the light-collection pattern PA2.

By synthesizing the light-collection pattern PA2 and the diffusion pattern PB2, as shown in FIG. 17, a low beam pattern P2 is formed in front of the vehicle. In the low beam pattern P2, both the light-collection pattern PA2 and the diffusion pattern PB2 are brought into a state emitted in the adjustment area PR2. Therefore, since the diffusion pattern PB2 is emitted on the part where the brightness of the light-collection pattern PA2 is reduced, a rapid decrease in brightness is suppressed in the adjustment area PR2. In addition, since both the light-collection pattern PA2 and the diffusion pattern PB2 are emitted in a part other than the adjustment area PR2, the horizontality of the horizontal cut-off line CLa is ensured.

As described above, in the vehicle light-guiding body 120 according to the Second Embodiment, the adjustment portion 28 has a shape recessed inward from the internal reflection surface 25, has the refraction surface 28*a* that emits a part of the light reflected by the second reflection surface 23 to the outside on the rear side in the front-rear direction, and has the total reflection surface 28*b* that totally reflects the light emitted from the refraction surface on the front side in the front-rear direction.

In the vehicle light-guiding body 20 described above, the adjustment portion 28 is formed so as to be further away from the light shielding portion 24 in the front-rear direction as it gets further away from the focal point P in the right-left direction. Therefore, it is possible to blur a boundary part of the adjustment area PR2 of the light-collection pattern PA2 on the opposite lane side in the right-left direction. Therefore, it is possible to alleviate a sense of omission of the adjustment area PR2 in the light-collection pattern PA2. In addition, it is possible to clearly form the boundary part on the vertical line V-V side in the right-left direction with respect to the adjustment area PR2 of the light-collection pattern PA2.

In the vehicle light-guiding body 20 described above, the adjustment portion 28 is formed such that the amount of recess decreases as the adjustment portion 28 approaches the focal point P in the right-left direction. According to this configuration, it is possible to adjust the brightness of the adjustment area PR2 of the light-collection pattern PA2 more finely such that the brightness increases toward the vertical line V-V side in the right-left direction.

The vehicle lighting unit according to this Embodiment can be configured to include the light source 10, the light-guiding body 120A for light collection, which is the vehicle light-guiding body 120 for guiding and emitting the light from the light source 10 and emitting the light-collection pattern PA2 to the front of the vehicle, and the light-guiding body 120B for diffusion, which guides the light from the light source 10 and emits the diffusion pattern PB2 to the front of the vehicle so as to partially overlap the light-collection pattern PA2. In this configuration, the adjustment portion 28 has a shape recessed inward from the internal reflection surface 25, has the refraction surface 28a, which emits a part of the light reflected by the second reflection surface 23 to the outside, on the front side in the front-rear direction, and has the total reflection surface 28b, which totally reflects the light emitted from the refraction surface, on the rear side in the front-rear direction, and the light-guiding body 120B for diffusion is formed such that the diffusion pattern PB2 overlaps the adjustment area PR2, which is an adjustment part by the adjustment portion 28 in the light-collection pattern PA2. According to this configuration, since the diffusion pattern PB2 is emitted to the part where the brightness of the light-collection pattern PA2 is reduced, a rapid decrease in brightness is suppressed in the adjustment area PR2. In addition, since both the light-collection pattern PA2 and the diffusion pattern PB2 are emitted in a part other than the adjustment area PR2, the horizontality of the horizontal cut-off line CLa is ensured.

A technical scope of the present invention is not limited to the above-described Embodiments, but appropriate modifications can be made within a range not departing from the gist of the present invention. In the above-described Embodiment, the configuration of the vehicle lighting tool 100 mounted on a vehicle traveling on a left-side traffic road has been explained as an example, but this is not limiting, and the similar explanation can be made also in a case where the vehicle headlamp is mounted on a vehicle traveling on a right-side traffic road.

Figure 18:
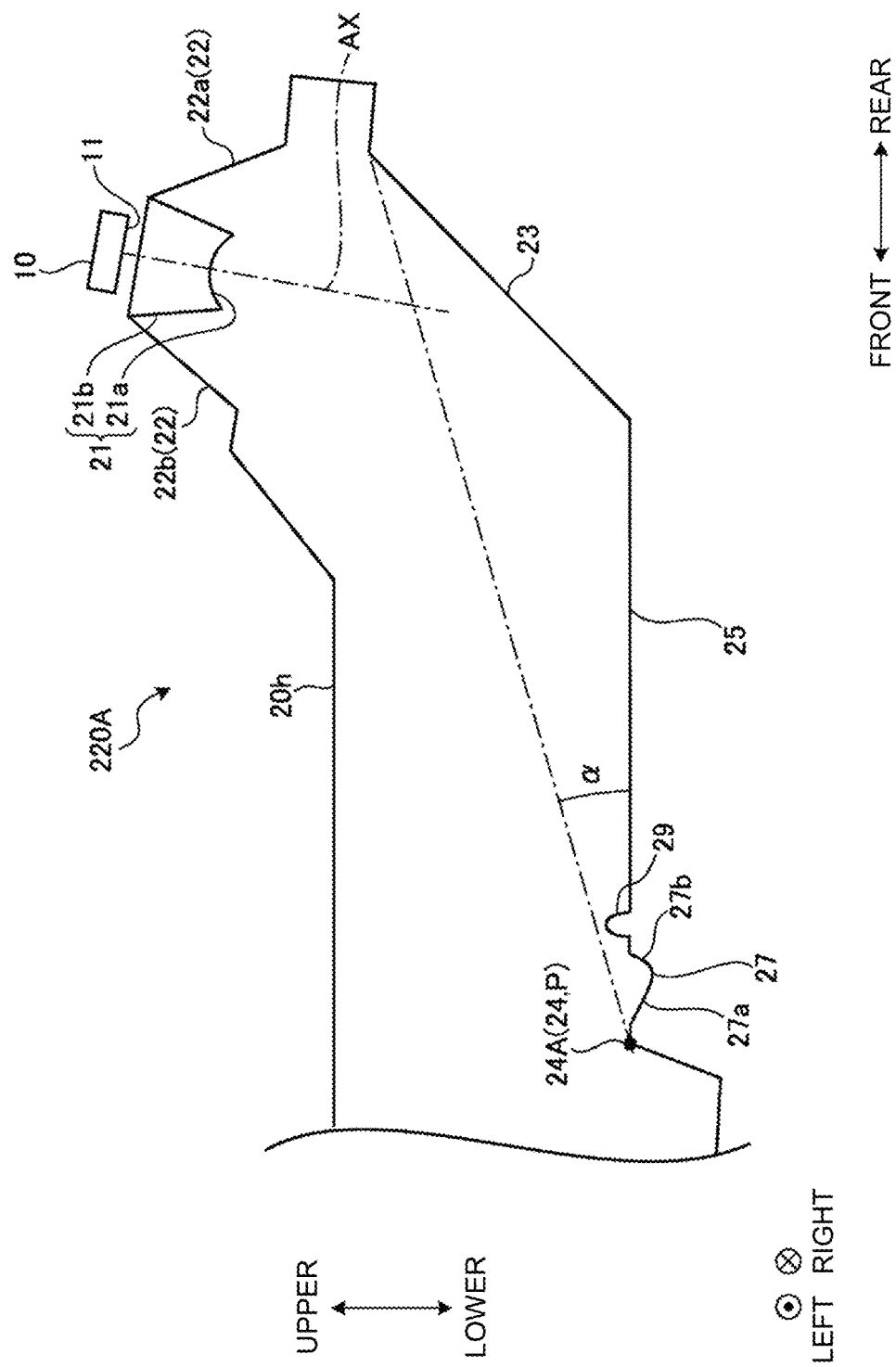
FIG. 18 is a diagram illustrating another example of a light-guiding body for light collection.

In addition, in the light-guiding body 20A for light collection described in the First Embodiment described above, another configuration may be provided on the rear of the adjustment portion 27 in the internal reflection surface 25. FIG. 18 is a diagram illustrating another example of the light-guiding body for light collection. As shown in FIG. 18, in the internal reflection surface 25 in a light-guiding body 220A for light collection, a concave portion 29 which is recessed inward from the internal reflection surface 25 may be provided on the rear of the adjustment portion 27. By providing the concave portion 29, it is possible to shield a part of the light which is internally reflected by the second reflection surface 23 and goes toward the focal point P. By means of this configuration, the illuminance of a part of the low beam pattern can be adjusted.

In addition, in the light-guiding bodies for light collection 20A, 120A, 220A described above, the configuration in which the second reflection surface 23 and the light shielding portion 24 are connected to each other by the internal reflection surface 25 has been described as an example, but this is not limiting.

Figure 19:
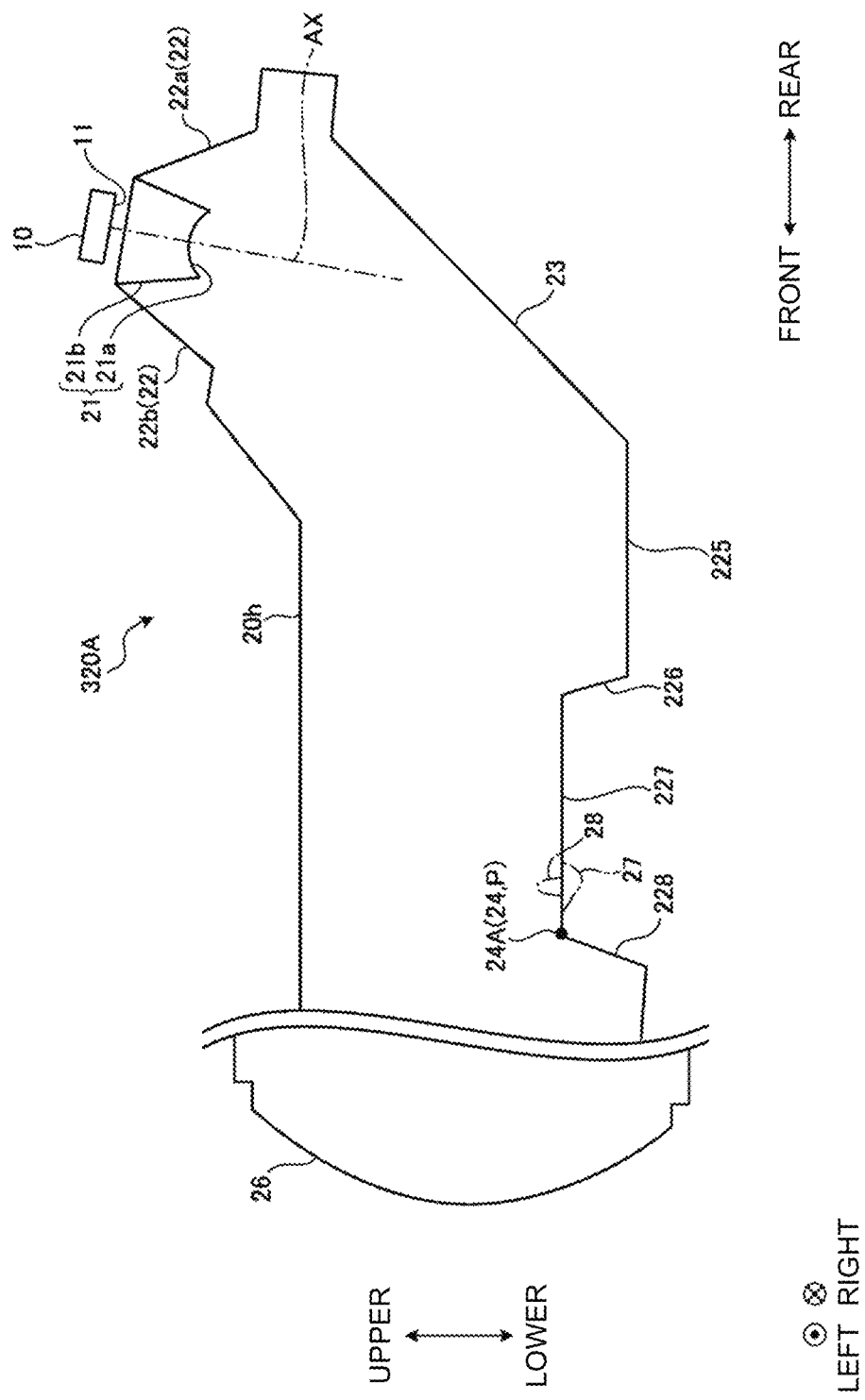
FIG. 19 is a diagram illustrating another example of a light-guiding body for light collection.

FIG. 19 is a view illustrating another example of the light-guiding body for light collection. As shown in FIG. 19, a light-guiding body 320A for light collection includes the incident surface 21, the first reflection surface 22, the second reflection surface 23, the light shielding portion 24, an adjustment surface 225, a transmission surface 226, an internal reflection surface 227, a re-incident surface 228, and the emission surface 26.

The configurations of the incident surface 21, the first reflection surface 22, the second reflection surface 23, the light shielding portion 24, and the emission surface 26 are similar to those described above. The adjustment surface 225 extends forward from the front-side end part of the second reflection surface 23. The transmission surface 226 is provided in a state of extending upward in the up-down direction from the front-side end part of the adjustment surface 225 and transmits a part of the light reflected by the second reflection surface 23 to the outside of the light-guiding body so as to direct the light forward. The internal reflection surface 227 is located between the upper-side end part of the transmission surface 226 and the light shielding portion 24 and internally reflects a part of the light internally reflected by the second reflection surface 23 to the front. The re-incident surface 228 is disposed in front of the transmission surface 226 and below the light shielding portion 24, and makes the light transmitted from the transmission surface 226 to the outside of the light-guiding body to be incident again. Note that the emission surface 26 emits the light internally reflected by the second reflection surface 23 and the light incident from the re-incident surface 228.

According to this configuration, a main pattern (low beam pattern) is formed by light which is reflected by the second reflection surface 23, passes above the internal reflection surface 227, passes through the light shielding portion 24 or above the light shielding portion 24, and is emitted from the emission surface 26, and light which is internally reflected by the internal reflection surface 227, passes above the light shielding portion 24 or the light shielding portion 24, and is emitted from the emission surface 26. In this configuration, since the adjustment surface 225 is disposed between the second reflection surface 23 and the internal reflection surface 227, a part of the light reflected by the second reflection surface 23 reaches the adjustment surface 225 without reaching the internal reflection surface 227 and is emitted to the outside from a part other than the emission surface 26 of the light-guiding body 220A for light collection via the adjustment surface 225. Therefore, the illuminance of a part of the low beam pattern can be reduced, and the illuminance of the entire pattern can be appropriately adjusted.

In addition, in the above-described Embodiment, the case where the light-guiding body for light collection forming the light-collection pattern and the light-guiding body for diffusion forming the diffusion pattern are separate vehicle light-guiding bodies has been explained as an example, but this configuration is not limiting. One vehicle light-guiding body may be configured to form both the light-collection pattern and the diffusion pattern. In this case, for example, in one vehicle light-guiding body, it can be realized by causing light to enter at least one of the two incident surfaces 21 disposed on the center side in the right-left direction and at least one of the two incident surfaces 21 disposed on the outer side in the right-left direction, respectively.

DESCRIPTION OF REFERENCE NUMERALS

AX Optical axis
CL Cut-off line
CLa, CLc Horizontal cut-off line
CLb, CLd Oblique cut-off line
L1, L2, L3, L4, L5, L6, L7, L8 Light
P Focal point
P1, P2 Low beam pattern
PA1, PA2 Light-collection pattern
PB1, PB2 Diffusion pattern
PQ1 Avoidance portion
PR1, PR2 Adjustment area
10 Light source
11 Light emission surface
20, 120 Vehicle light-guiding body
20A, 120A, 220A, 320A Light-guiding body for light collection
20B, 120B Light-guiding body for diffusion
20g Corner portion
20h Upper surface
20La, 20Lc Horizontal portion
20Lb, 20Ld Inclined portion
20Le, 29 Concave portion
21 Incident surface
21a First surface
21b Second surface
22 First reflection surface
22a First rear area
22b First front area
23 Second reflection surface
24, 24A, 24B, 124, 124A 124B Light shielding portion
25, 227 Internal reflection surface
26 Emission surface
27, 28 Adjustment portion
27a Inclined surface
27b Folded surface
28a Refraction surface
28b Reflection surface
28c First portion
28d Second portion
100 Vehicle lighting tool
150 Vehicle lighting unit
151 Housing
152 Outer lens
225 Adjustment surface
226 Transmission surface
228 Re-incident surface

The invention claimed is:

1. A vehicle light-guiding body comprising:
an incident surface on which light from a light source is incident;
a first reflection surface that internally reflects the light incident from the incident surface;
a second reflection surface that internally reflects, to a front, at least a part of the light reflected by the first reflection surface such that the part of the light passes through a focal point and a vicinity of the focal point;
a light shielding portion that shields a part of the light reflected by the second reflection surface;
an internal reflection surface that is located between a front-side end part of the second reflection surface and the light shielding portion and internally reflects, to a front, a part of the light internally reflected by the second reflection surface;
an emission surface that emits light internally reflected by the second reflection surface; and
an adjustment portion that is provided at a part which is a rear of the light shielding portion in the internal reflection surface and closer to one of right and left than the focal point of the second reflection surface and emits a part of the light reflected by the second reflection surface from a part different from the emission surface to an outside by internally reflecting or refracting a part of the light.

2. The vehicle light-guiding body according to claim 1, wherein
the adjustment portion has a shape protruding outward from the internal reflection surface and includes an inclined surface inclined downward toward a rear such that a part of the light reflected by the second reflection surface is internally reflected toward a part different from the emission surface, on a front side in a front-rear direction, and a folded surface folded upward from a rear-side end part of the inclined surface and connected to the internal reflection surface on the rear side in the front-rear direction.

3. The vehicle light-guiding body according to claim 2, wherein
the folded surface is provided in a state of standing in an up-down direction as compared with the inclined surface.

4. The vehicle light-guiding body according to claim 2, wherein
the adjustment portion is formed such that an amount of projection gradually decreases from a center part in a right-left direction toward both sides.

5. The vehicle light-guiding body according to claim 1, wherein
the internal reflection surface has a concave portion recessed inward from the internal reflection surface at a rear of the adjustment portion.

6. The vehicle light-guiding body according to claim 1, wherein
the adjustment portion has a shape recessed inward from the internal reflection surface, has a refraction surface that emits a part of light reflected by the second reflection surface to an outside, on a rear side in a front-rear direction, and has a total reflection surface that totally reflects light emitted from the refraction surface, on a front side in a front-rear direction.

7. The vehicle light-guiding body according to claim 6, wherein
the adjustment portion is formed such that the further away the adjustment portion is separated from the focal point in the right-left direction, the further away the adjustment portion is separated from the light shielding portion in the front-rear direction.

8. The vehicle light-guiding body according to claim 6, wherein
the adjustment portion is formed such that the closer the adjustment portion gets to the focal point in a right-left direction, the smaller a recess amount becomes.

9. A vehicle lighting unit, comprising:
a light source;
a light-guiding body for light collection, which is the vehicle light-guiding body according to claim 1 for guiding and emitting light from the light source, that emits a light-collection pattern to a front of a vehicle; and a light-guiding body for diffusion that guides the light from the light source and emits a diffusion pattern to a front of a vehicle such that a part overlaps the light-collection pattern.

10. The vehicle lighting unit according to claim 9, wherein the adjustment portion has a shape protruding outward from the internal reflection surface, has an inclined surface inclined downward toward a rear such that a part of the light reflected by the second reflection surface is internally reflected toward a part different from the emission surface, on a front side in a front-rear direction, and has a folded surface folded upward from a rear-side end part of the inclined surface and connected to the internal reflection surface, on a rear side in a front-rear direction; and the light-guiding body for diffusion is formed such that the diffusion pattern does not overlap an adjustment part by the adjustment portion in the light-collection pattern.

11. The vehicle lighting unit according to claim 9, wherein the adjustment portion has a shape recessed inward from the internal reflection surface, has a refraction surface which emits a part of light reflected by the second reflection surface to an outside, on a rear side in a front-rear direction, and has a total reflection surface that totally reflects the light emitted from the refraction surface, on a front side in a front-rear direction, and the light-guiding body for diffusion is formed such that the diffusion pattern overlaps an adjustment part by the adjustment portion in the light-collection pattern.

* * * * *